United States Patent
Naoe

(10) Patent No.: US 7,901,805 B2
(45) Date of Patent: Mar. 8, 2011

(54) MAGNETIC RECORDING MEDIUM AND METHOD OF PRODUCING THE SAME

(75) Inventor: Koji Naoe, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 754 days.

(21) Appl. No.: 11/729,842

(22) Filed: Mar. 30, 2007

(65) Prior Publication Data

US 2007/0231612 A1    Oct. 4, 2007

(30) Foreign Application Priority Data

Mar. 30, 2006  (JP) .................................. 2006-094924

(51) Int. Cl.
*G11B 5/706*   (2006.01)
(52) U.S. Cl. ........................................ 428/844; 427/130
(58) Field of Classification Search .................. None
See application file for complete search history.

(56) References Cited

U.S. PATENT DOCUMENTS

| | | | |
|---|---|---|---|
| 5,840,410 A | | 11/1998 | Oiri et al. |
| 6,312,796 B1 * | | 11/2001 | Zinbo ........................... 428/323 |
| 6,893,701 B2 * | | 5/2005 | Noguchi et al. ........... 428/839.6 |
| 2003/0175469 A1 | | 9/2003 | Saito et al. |
| 2005/0153062 A1 * | | 7/2005 | Naoe .............................. 427/127 |
| 2005/0282040 A1 * | | 12/2005 | Oyanagi et al. ............... 428/840 |

FOREIGN PATENT DOCUMENTS

| | | |
|---|---|---|
| JP | 8-249649 A | 9/1996 |
| JP | 2000-149243 A | 5/2000 |
| JP | 2001-170956 A | 6/2001 |
| JP | 2002-367156 A | 12/2002 |
| JP | 2003-85734 A | 3/2003 |
| JP | 2003-263718 A | 9/2003 |
| JP | 2005-228369 A | 8/2005 |
| JP | 2005-339610 A | 12/2005 |
| JP | 2005-353113 A | 12/2005 |

OTHER PUBLICATIONS

English Machine translation of JP 2005-353113, Dec. 2005.*
English Machine translation of JP 08-249649, Sep. 1996.*
Notice of Reasons for Rejection dated Mar. 16, 2010 issued in counterpart Application No. 2006-094924.

* cited by examiner

*Primary Examiner* — Holly Rickman
(74) *Attorney, Agent, or Firm* — Sughrue Mion, PLLC

(57) ABSTRACT

A magnetic recording medium, which comprises: a nonmagnetic support; and a magnetic layer comprising a ferromagnetic powder and a binder, wherein an average surface roughness (Ra) at a center of a surface of the magnetic layer measured by using an atomic force microscope (AFM) is 2 nm or less, the maximum height (Rmax) thereof is 50 nm or less, and an arithmetic average of phase difference between a drive signal and a response signal of a probe measured with the atomic force microscope in a tapping mode is from 2 to 20°, and a method of producing the same.

10 Claims, No Drawings

MAGNETIC RECORDING MEDIUM AND METHOD OF PRODUCING THE SAME

BACKGROUND OF THE INVENTION

1. Field of the Invention

This invention relates to a magnetic recording medium and a method of producing the same. More specifically, it relates to a magnetic recording medium of the coated type which has smooth surface properties, has small spacing between head and the medium, enables high-density recording, shows favorable running performance and causes little head wear, and a method of producing a magnetic recording medium whereby the above-described characteristics can be established while achieving a high productivity.

2. Description of the Related Art

In the field of magnetic recording, recording wavelength becomes shorter with the recent increases in the recording density. With the tendency toward using MR heads as reproduction heads, attempts have been made to finely divide a magnetic material and thus increase the number of magnetic particles per unit volume thereby reducing medium noises. To magnetically separate magnetic particles, there has been employed high-dispersion of a magnetic solution. When a magnetic solution is high-dispersed, however, there arises a problem that the exposure of abrasive particles from a magnetic layer is inhibited or the projection height on the magnetic layer surface is lowered and thus the durability is worsened.

To solve this problem and establish both of high-density recording and an excellent run durability, there has been proposed a method wherein diamond having an elevated abrasive power and a controlled particle size is employed as an abrasive (see JP-A-2000-149243 and JP-A-2003-85734).

JP-A-2000-149243 and JP-A-2003-85734 propose a technique of dispersing diamond in a magnetic solution by using a sand mill. However, this method suffers from a problem that the diamond causes abrasion of media beads (for example, glass beads or $ZrO_2$ beads) or the inner wall (mainly made of stainless steel) of the disperser in the course of the dispersion and thus abrasion dusts contaminate the magnetic solution. Therefore, both of high-density recording and an excellent run durability can be hardly established by using the known techniques as described above.

Under these circumstances, the present applicant has proposed a method of manufacturing a magnetic recording medium which comprises separately dispersing a magnetic solution which contains the ferromagnetic powder and the binder, and an abrasive solution which contains an abrasive and a solvent, then mixing the magnetic solution and the abrasive solution together, and after that, subjecting the liquid mixture of the magnetic solution with the abrasive solution to a dispersion treatment by the application of ultrasonic waves (JP-A-2005-228369).

This production method is useful, since a magnetic recording medium suffering from little contamination with foreign matters, having excellent run durability and causing little head wear can be obtained thereby.

To enlarge the recording capacity of a magnetic recording medium, it is required to elevate the recording density. For this purpose, attempts have been made to reduce the particle size of a magnetic material in a magnetic layer and smoothen the surface. Furthermore, there have been proposed anisotropic magnetoresistive heads (so-called AMR heads) and giant magnetoresistive heads (so-called GMR heads) having further elevated sensitivity.

However, it has been found out that, in the case where the surface roughness is extremely elevated by using the technique disclosed in JP-A-2005-228369, there arise troubles such as sticking of a medium to a head and stripping of a magnetic layer due to sliding with a guide.

SUMMARY OF THE INVENTION

Accordingly, an object of the invention is to provide a magnetic recording medium of the coated type which has smooth surface properties, has small spacing between head and the medium, enables high-density recording, shows favorable running performance and causes little head wear, and a method of producing a magnetic recording medium whereby the above-described characteristics can be established while achieving a high productivity.

The invention is as follows.

(1) A magnetic recording medium, which comprises:
a nonmagnetic support; and
a magnetic layer comprising a ferromagnetic powder and a binder,
wherein an average surface roughness (Ra) at a center of a surface of the magnetic layer measured by using an atomic force microscope (AFM) is 2 nm or less, the maximum height (Rmax) thereof is 50 nm or less, and
an arithmetic average of phase difference between a drive signal and a response signal of a probe measured with the atomic force microscope in a tapping mode is from 2 to 20°.

(2) The magnetic recording medium as described in (1) above,
wherein the ferromagnetic powder is a hexagonal ferrite powder having an average tabular diameter of 30 nm or less.

(3) The magnetic recording medium as described in (1) or (2) above,
wherein the magnetic layer further comprises diamond particles having an average particle diameter of 100 nm or less.

(4) A method of producing a magnetic recording medium, the method comprising:
separately dispersing a magnetic solution comprising a ferromagnetic powder and a binder, and an abrasive solution comprising an abrasive; then
mixing the magnetic solution with the abrasive solution to give a coating solution for a magnetic layer; and
applying the coating solution on a nonmagnetic support to form a magnetic layer,
wherein a liquid mixture obtained by mixing the magnetic solution with the abrasive solution is subjected to both of an air-bubbling treatment and an ultrasonication treatment.

(5) The method as described in (4) above,
wherein the air-bubbling treatment is a treatment that is conducted by stirring with a high-speed stirrer having stirring blades at a stirring blade peripheral speed of 10 m/sec or higher for 5 minutes or longer, and then
the ultrasonication treatment is conducted.

(6) The method as described in (4) or (5) above, which further comprises:
dispersing a carbon black solution comprising a carbon black with a bead mill; then
subjecting the obtained dispersion to an air-bubbling treatment followed by an ultrasonication treatment; and then
mixing the dispersion with the magnetic solution and the abrasive solution to thereby give a coating solution for a magnetic layer.

(7) The magnetic recording medium as described in (3) above, wherein an amount of the diamond particles is from 0.05 to 5% by mass based on the ferromagnetic powder.

(8) The magnetic recording medium as described in any of (1) to (3) and (7) above, wherein the arithmetic average of phase difference is from 2 to 10°.

(9) The magnetic recording medium as described in any of (1) to (3), (7) and (8) above, wherein the average surface roughness (Ra) is from 0.5 to 1.5 nm.

(10) The magnetic recording medium as described in any of (1) to (3) and (7) to (9) above, wherein the maximum height (Rmax) is from 10 to 50 nm.

DETAILED DESCRIPTION OF THE INVENTION

Next, the invention will be described in greater detail.

The magnetic layer in the magnetic recording medium of the invention is characterized by having an arithmetic average of phase difference detected under an atomic force microscope of from 2 to 20°. This arithmetic average of phase difference is preferably from 2 to 10° and more preferably from 2 to 6°. The inventor has found out that, in the case where a magnetic layer having an ultrasmooth surface, which has an average surface roughness (Ra) at the center measured by using an AFM of 2 nm or less and a maximum height (Rmax) thereof of 50 nm or less, contains a solid additive (an abrasive or carbon black) and has microcavities in the surface layer thereof, troubles such as sticking of the medium to a head and stripping of the magnetic layer due to sliding with a guide can be prevented. The inventor has further found out that the mode of the solid additive and microcavities as described above correlates to the arithmetic average of phase difference detected by the atomic force microscope. So long as the arithmetic average of phase difference falls within the range as specified above, the surface layer of the magnetic layer has the solid additive and the microcavities in an appropriate state and thus troubles such as sticking of a medium to a head and stripping of a magnetic layer due to sliding with a guide can be solved. It is desirable that the surface layer of the magnetic layer has an appropriate amount of a liquid lubricant in addition to the solid additive and cavities as described above.

In the case where the arithmetic average of phase difference is less than 2°, the surface layer of the magnetic layer is mainly made up of a layer comprising a magnetic material and a binder. In this case, therefore, the surface layer has no abrasive, carbon black or microcavity. Thus, there arise troubles such as sticking of the medium to a head and stripping of the magnetic layer due to sliding with a guide. In the case where the arithmetic average of phase difference exceeds 20°, on the contrary, there arises another problem that the packing ratio of the magnetic material in the surface layer of the magnetic layer decreases.

The phase difference detected under an atomic force microscope as used herein can be measured by detecting the phase difference between the drive signal and the response signal of a probe while monitoring the surface shape in the tapping mode. Phase difference is determined herein using a scanning probe microscope (D3100; manufactured by Digital Instruments) under the following conditions. In this measurement method which is called "Phase Imaging", a difference in cohesive force or viscoelasticity is usually indicated as phase difference contrast. In the invention, the arithmetic average of phase difference is determined as in determining the average surface roughness (Ra) at the center from the difference in height in the surface shape. Based on the correlation to the AFM surface shape, it is considered that phase data within a depth of 50 nm, within a depth of 20 nm in many cases, from the surface layer of the magnetic layer is detected under the following conditions.

Measurement area: 5 μm×5 μm
Tip: diamond needle with a curvature of 10 nm
Scan rate: 1 Hz
Scan angle: 0°
Tip speed: 10 μm/sec
Scan number: 512
Probe frequency: 265 to 269 kHz
Phase: 70°
Output: 1.3 to 2.4 V Next, each components constituting the magnetic recording medium will be illustrated.

[Nonmagnetic Support]

As the nonmagnetic support to be used in the invention, use can be made of a publicly known film made of, for example, a polyester such as polyethylene terephthalate or polyethylene naphthalte, a polyolefin, cellulose triacetate, polycarbonate, polyamide, polyimide, polyamideimide, polysulfone, polyaramide, an aromatic polyamide or polybenzoxazole. It is preferable to use a support having a high strength such as polyethylene naphthalte or polyamide. If required, it is also possible to use a layered support as disclosed by JP-A-3-224127 to thereby differentiate the surface roughnesses of the magnetic face and the nonmagnetic support face. Such a support may be subjected to a pretreatment such as corona discharge, plasma treatment, adhesion facilitation, heating or dedusting. It is also possible to use an aluminum or glass plate as the support of the invention.

Among all, a polyester support (hereinafter called merely polyester) is preferred. This is a polyester made up of a dicarboxylic acid and a diol such as polyethylene terephthalate or polyethylene naphthalate.

Examples of the dicarboxylic acid component serving as a main constituent include terephthalic acid, isophthalic acid, phthalic acid, 2,6-naphthalenedicarboxylic acid, 2,7-naphthalene dicarboxylic acid, diphenylsulfone dicarboxylic acid, diphenyl ether dicarboxylic acid, diphenylethane dicarboxylic acid, cyclohexane dicarboxylic acid, diphenyl dicarboxylic acid, diphenyl thioether dicarboxylic acid, diphenyl ketone dicarboxylic acid, phenylindane dicarboxylic acid and so on.

Examples of the diol component include ethylene glycol, propylene glycol, tetramethylene glycol, cyclohexane dimethanol, 2,2-bis(4-hydroxyphenyl)propane, 2,2-bis(4-hydroxyethoxyphenyl)propane, bis(4-hydroxyphenyl)sulfone, bisphenolfluorene dihydroxyethyl ether, diethylene glycol, neopentyl glycol, hydroquinone, cyclohexanediol and so on.

Among polyesters comprising these components as the main constituents, polyesters comprising, as the main constituents, terephthalic acid and/or 2,6-naphthalene dicarboxylic acid as the dicarboxylic acid component and ethylene glycol and/or 1,4-cyclohexane dimethanol as the diol component are preferable from the viewpoints of transparency, mechanical strength, dimensional stability and so on.

In particular, a polyester comprising polyethylene terephthalate or polyethylene-2,6-naphthalate as the main constituent, a copolymer polyester comprising terephthalic acid, 2,6-naphthalene dicarboxylic acid and ethylene glycol and a polyester comprising a mixture of two or more types of these polyesters as the main constituents are preferable. A polyetser comprising polyethylene-2,6-naphthalte as the main constituent is particularly preferable.

The polyester to be used in the invention may be a biaxially stretched polyester or a laminate having two or more layers.

The polyester may be a copolymer having an additional copolymerizable component or a mixture having another polyester. As examples thereof, the dicarboxylic acid components and the diol components described above and polyesters comprising the same can be cited.

To minimize delamination in film, it is possible in the polyester to be used in the invention to copolymerize an aromatic dicarboxylic acid having a sulfonate group or an ester-forming derivative thereof, a dicarboxylic acid having a polyoxyalkylene group or an ester-forming derivative thereof, a diol having a polyoxyalkylene group, etc.

Considering the polymerization reactivity of the polyester and the transparency of the film, it is particularly preferable to use 5-sodium sulfoisophthalate, 2-sodium sulfoterephthalate, 4-sodium sulfophthalate, 4-sodium sulfo-2,6-naphthalenedicarboxylate, compounds wherein sodium in the above compounds are substituted by other metals (for example, potassium or lithium), an ammonium salt, a phosphonium salt or the like or ester-forming derivatives thereof, polyethylene glycol, polytetramethylene glycol, polyethylene glycol-polypropylene glycol copolymer and compounds wherein the hydroxyl groups at both ends of the above compounds are oxidized into carboxyl groups. To copolymerize for this purpose, it is preferable to use such a compound in an amount of from 0.1 to 10% by mol based on the dicarboxylic acid constituting the polyester.

In order to improve heat resistance, it is possible to copolymerize a bisphenol compound or a compound having a naphthalene ring or a cyclohexane ring. Such a compound is preferably copolymerized in an amount of from 1 to 20% by mol based on the dicarboxylic acid constituting the polyester.

In the invention, the polyester can be synthesized in accordance with a publicly known method of producing a polyester without particular restriction. For example, use can be made of the direct esterification method which comprises subjecting the dicarboxylic acid component and the diol component directly to an esterification reaction, or the transesterification method which comprises first subjecting to a dialkyl ester employed as the dicarboxylic acid component and the diol component to a transesterification reaction, then heating the reaction mixture under reduced pressure and thus removing the excessive diol component to thereby conduct polymerization. In this step, a transesterification catalyst or a polymerization may be used or a heat resistance stabilizer may be added, if needed.

Moreover, it is possible to add one or more additives selected from among, for example, a coloring inhibitor, an antioxidant, a crystal nucleating agent, a slippering agent, a stabilizer, an antiblocking agent, an ultraviolet light absorber, a viscosity-controlling agent, a defoaming/clarifying agent, an antistatic agent, a pH adjusting agent, a dye, a pigment and a reaction-terminating agent in any step during the synthesis.

It is also possible to add a filler to the polyester. Examples of the filler include inorganic powders such as spherical silica, colloidal silica, titanium oxide and alumina and organic fillers such as crosslinked polystyrene and a silicone resin.

It is also possible to elevate the rigidity of the support by superstretching the material or forming a layer of a metal, a half metal or an oxide thereof on the surface of the support.

It is preferable that the thickness of the polyester to be used as the nonmagnetic support in the invention is from 3 to 80 μm, more preferably from 3 to 50 μm and particularly preferably from 3 to 10 μm. It is also preferable that the average surface roughness (Ra) at the center of the support surface is 6 nm or less, more preferably 4 nm or less. This Ra is measured by using a surface roughness meter (HD2000; manufactured by WYKO Co.).

The lengthwise and widthwise Young's modules of the nonmagnetic support are preferably 6.0 GPa or above and more preferably 7.0 GPa or above.

In the magnetic recording medium of the invention, a magnetic layer containing a ferromagnetic powder and a binder is formed at least one face of the nonmagnetic support as described above. It is preferable that a nonmagnetic layer (an under layer), which is substantially nonmagnetic, is formed between the nonmagnetic support and the magnetic layer.

[Magnetic Layer]

It is preferable that the volume of the ferromagnetic powder contained in the magnetic layer is from 1000 to 20000 $nm^3$, more preferably from 2000 to 8000 $nm^3$. By controlling the volume within the range as specified above, worsening in the magnetic characteristics caused by heat fluctuation can be effectively prevented and, at the same time, a favorable C/N (S/N) can be obtained while sustaining low noise. As the ferromagnetic powder, it is preferable to use a ferromagnetic metal powder, a hexagonal ferrite powder or an iron nitride-based powder, though the invention is not restricted thereto.

The volume of an acicular powder is determined from the major axis length and the minor axis length on the assumption that the particles are column-shaped.

The volume of a tabular powder is determined from the tabular diameter and the axis length (tabular thickness) on the assumption that the particles are square column-shaped (hexagonal-shaped in the case of a hexagonal ferrite powder).

In the case of an iron nitride-based powder, the volume is determined on the assumption that the particles are spherical.

The size of a magnetic material is determined as follows. First, a portion of an appropriate amount of the magnetic layer is stripped off. To 30 to 70 mg of the magnetic layer thus stripped, n-butylamine is added and the mixture is sealed in a glass tube. Then, it is put in a heat decomposition apparatus and heated therein for about one day at 140° C. After cooling, the contents are taken out from the glass tube and divided into a liquid and a solid by centrifugation. The solid thus separated is washed with acetone to give a powdery sample for TEM. This sample is photographed under a scanning transmission electron microscope (H-9000; manufactured by Hitachi, Co.) at 100000× magnification. Then, it is printed on a photographic paper sheet at a total magnification ratio of 500000 to give a photograph of particles. In this photograph, the target magnetic material is selected and the outline of the particle is traced with a digitizer. Thus, 500 particles are measured with the use of an image analysis software (KS-400; manufactured by Carl Zeiss).

The size of a powder such as a magnetic material as used herein (hereinafter referred to as "powder size") has the following meaning. (1) In the case of an acicular, spindle-shaped or column-shaped (the height being larger than the maximum diameter of the bottom face) powder, the powder size is expressed in the length of the major axis constituting the powder, i.e., the major axis length. (2) In the case of a tabular or column-shaped (the thickness to height being smaller than the maximum diameter of the bottom face) powder, the powder size is expressed in the maximum major diameter of the tabular face or the bottom face. (3) In the case of a spherical, polyhedral or irregular-shaped powder in which the major axis constituting the powder cannot be specified from its shape, the powder size is expressed in the Heywood diameter that is determined by the circle projection method.

The average powder size of the powder is the arithmetic average of the powder size as described above that is determined by the above-described measurement method using 500 primary particles. The term "primary particles" means independent particles not undergoing aggregation.

The average acicular ratio of the powder means a value determined by measuring the length of the minor axis of each of the particles (i.e., the minor axis length) in the above measurement and calculating the arithmetic average of the (major axis length/minor axis length) ratios. The term "minor axis length" is defined as follows: in the case (1) of the definition of the powder size as given above, it means the length of the minor axis constituting the powder; in the case (2) thereof, it means the thickness to height; and in the case (3) thereof wherein the minor axis cannot be distinguished from the major axis, the (major axis length/minor axis length) ratio is referred to as 1 for convenience.

When the powder has a definite shape (for example, in the case (1) of the definition of the powder size as given above), the average powder size is referred to as the average major axis length. In the case (2) thereof, the average powder size is referred to as the average tabular diameter, while the arithmetic average of the (maximum diameter/thickness to height) ratio is referred to as the average tabular ratio. In the case (3) thereof, the average powder size is referred to as the average diameter (also called the average particle diameter or the average particle size). In measuring the powder size, (standard deviation/mean) expressed in percentage is defined as the coefficient of variation.

<Ferromagnetic Metal Powder>

Although the ferromagnetic metal powder to be used in the magnetic layer of the magnetic recording medium of the invention is not particularly restricted so long as it contains Fe (including its alloy) as the main component, a ferromagnetic alloy powder containing α-Fe as the main component is preferable. In addition to the atom as specified above, this ferromagnetic powder may contain other atom(s) such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr or B. It is preferable that it contains at least one of Al, Si, Ca, Y, Ba, La, Nd, Co, Ni and B (more preferably, C, Al and/or Y) in addition to α-Fe. More specifically speaking, it is preferable that Co, Al and Y are contained respectively from 10 to 40% by atom, from 2 to 20% by atom and from 1 to 15% by atom each based on Fe.

The ferromagnetic metal powder may be treated before the dispersion by using a dispersant, a lubricant, a surfactant or an antistatic agent as will be described hereinafter. Moreover, the ferromagnetic metal powder may contain water, a hydroxide or an oxide in a small amount. It is preferable that the water content of the ferromagnetic metal powder is controlled to 0.01 to 2%. It is preferable to optimize the water content of the ferromagnetic metal powder depending on the kind of the binder. It is preferable that the pH value of the ferromagnetic metal powder is optimized depending on the combination with the binder to be used. Namely, the pH value thereof usually ranges from 6 to 12, preferably from 7 to 11. The ferromagnetic metal powder sometimes contain a soluble inorganic ion such as Na, Ca, Fe, Ni, Sr, $NH_4$, $SO_4$, Cl, $NO_2$ or $NO_3$, though it is essentially preferable that the ferromagnetic metal powder is free from any of them. However, the characteristics are never affected so long as the total amount of these ions is not more than about 300 ppm. In the ferromagnetic metal powder to be used in the invention, a lower porosity is preferred. Thus, the porosity thereof is preferably 20% by volume or less, more preferably 5% by volume or less.

The average major axis length of the ferromagnetic metal powder is preferably from 20 to 100 nm, more preferably from 20 to 60 nm and particularly preferably from 20 to 40 nm.

The crystalline size of the ferromagnetic metal powder is preferably from 70 to 180 Å (angstrom), more preferably from 80 to 140 Å and particularly preferably from 90 to 130 Å.

The crystalline size is the average determined from the half width of diffraction peak by the Scherrer method with the use of an X-ray diffractometer (RINT 2000 SERIES; manufactured by Rigaku Ltd.) using an X-ray source CuKα1, a tube voltage 50 kV and a tube current 300 mA.

The specific surface area by the BET method ($S_{BET}$) of the ferromagnetic metal powder is preferably 45 to 120 $m^2/g$, more preferably from 50 to 100 $m^2/g$.

In the case where the $S_{BET}$ is less than 45 $m^2/g$, noise is elevated. It is undesirable that $S_{BET}$ exceeds 120 $m^2/g$, since favorable surface characteristics can be hardly obtained in this case. So long as $S_{BET}$ falls within the range as defined above, both of favorable surface characteristics and low noise can be established. It is preferable to control the water content of the ferromagnetic metal powder to 0.01 to 2%.

It is preferable to optimize the water content of the ferromagnetic metal powder depending on the kind of the binder. It is preferable to optimize the pH value of the ferromagnetic metal powder depending on the kind of the binder and it ranges from 4 to 12, preferably from 6 to 10.

If necessary, the ferromagnetic powder may be made into Al, Si, P or an oxide thereof by surface-treating. The amount thereof is from 0.1 to 10% based on the ferromagnetic powder. It is preferable to conduct the surface treatment, since the adsorption of a lubricant such as a fatty acid can be thus regulated to 100 $mg/m^2$ or less.

The ferromagnetic metal powder sometimes contain a soluble inorganic ion such as Na, Ca, Fe, Ni or Sr, though the characteristics are never affected so long as the total amount of these ions is not more than about 200 ppm. In the ferromagnetic metal powder to be used in the invention, a lower porosity is preferred. Thus, the porosity thereof is preferably 20% by volume or less, more preferably 5% by volume or less.

Concerning the shape of the ferromagnetic metal powder, it may be either acicula-shaped, grain-shaped, rice grain-shaped or tablet-shaped, so long as the particle volume fulfills the requirement as described above. It is particularly preferable to use a ferromagnetic powder of the acicular type. In the case of the acicula-shaped ferromagnetic metal powder, the average acicular ratio is preferably from 4 to 12, more preferably from 5 to 8. The antimagnetic force (Hc) of the ferromagnetic metal powder is preferably from 159.2 to 278.5 kA/m (from 2000 to 3500 Oe), more preferably from 167.1 to 238.7 kA/m (from 2100 to 3000 Oe). The saturation magnetic flux density thereof is preferably from 150 to 300 mT (from 1500 to 3000 G), more preferably from 160 to 290 mT. The saturation magnetization (σs) thereof is preferably from 90 to 140 A $m^2$/kg (from 90 to 140 emu/g), more preferably from 100 to 120 A $m^2$/kg. A smaller SFD (switching field distribution) of the magnetic material per se is preferred. An SFD of 0.6 or less is suitable for high-density digital magnetic recording, since favorable electromagnetic conversion characteristics and a high output can be obtained and sharp magnetic inversion and a small peak shift can be established in this case. To narrow the Hc distribution in the ferromagnetic metal powder, there have been proposed methods of improving geothite particle size distribution, using monodispersion $\alpha Fe_2O_3$, preventing interparticle sintering and so on.

As the ferromagnetic metal powder, use can be made of a product obtained by a publicly known method. Examples of such a method include a method in which moisture-containing iron oxide or iron oxide having been treated with an antisintering agent is reduced by using a reductive gas to give Fe or Fe—Co particles, a method in which reduction is conducted with the use of a complex organic acid salt (mainly an oxalic acid salt) and a reductive gas such as hydrogen, a method in which a metal carbonyl compound is thermally decomposed, a method in which an aqueous solution of a ferromagnetic metal is reduced by adding an reducing agent such as sodium borohydride, a hypophosphorous salt or hydrazine, a method in which a metal is vaporized in an inert gas under a low pressure to thereby give a powder, and so on. The ferromagnetic metal powder thus obtained is subjected to a publicly known deacidification treatment. It is preferable to employ a method comprising reducing moisture-containing iron oxide or iron oxide by using a reductive gas such as hydrogen and forming an oxide film on the surface while controlling the partial pressures of an oxygen-containing gas and an inert gas, temperature and reaction time, since only small magnetic loss arises in this case.

<Ferromagnetic Hexagonal Ferrite Powder>

Examples of the ferromagnetic hexagonal ferrite powder include substituted barium ferrite, substituted strontium ferrite, substituted lead ferrite and substituted calcium ferrite each optionally, cobalt-substituted and so on. More specifically speaking, examples thereof include magnetoplanbite type barium ferrite, magnetoplanbite type strontium ferrite, and magnetoplanbite type barium and strontium ferrites partially comprising a spinel phase. In addition to the predetermined atoms, the ferromagnetic hexagonal ferrite powder may contain Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, etc. In general, use can be made of a ferromagnetic hexagonal ferrite powder comprising elements such as Co—Zn, Co—Ti, Co—Ti—Zr, Co—Ti—Zn, Ni—Ti—Zn, Nb—Zn—Co, Sb—Zn—Co, Nb—Zn and so on. Moreover, the ferromagnetic hexagonal ferrite powder may contain impurities inherent to the material and/or production method employed. Preferable examples of the additional atoms and the amount thereof are the same as in the ferromagnetic metal powder as described above.

It is preferable that the particle size of the hexagonal ferrite powder satisfies the volume as defined above. The average tabular diameter thereof is preferably 30 nm or less, more preferably from 10 to 25 nm and particularly preferably from 15 to 20 nm.

The average tabular ratio is from 1 to 15, preferably from 1 to 7. So long as the average tabular ratio falls within the range of 1 to 15, sufficient orientation can be achieved while maintaining a high the packing ratio in the magnetic layer and an increase in noise caused by antiparticle stacking can be prevented. The specific surface area determined by the BET method ($S_{BET}$) in the particle size range as specified above is preferably 40 m$^2$/g or above, more preferably from 40 to 200 m$^2$/g and most preferably from 60 to 100 m$^2$/g.

In usual, a narrower tabular diameter and tabular thickness distribution of the hexagonal ferrite powder is preferred. The tabular diameter and the tabular thickness can be numerically quantified by measuring 500 particles selected at random in a TEM photograph of the particles and comparing the data. Although the tabular diameter and tabular thickness distribution is not in normal distribution in many cases, the standard deviation calculated on the basis of the mean ($\sigma$/mean) is from 0.1 to 1.0. Attempts are made to sharpen the particle size distribution by homogenizing the particle formation system as far as possible and treating the thus formed particles to thereby improve the distribution. For example, there is known a method of selectively dissolving ultrafine particles in an acid solution.

The antimagnetic force (Hc) of the hexagonal ferrite powder may be adjusted to from 143.3 to 318.5 kA/m (from 1800 to 4000 Oe), preferably from 159.2 to 238.9 kA/m (from 2000 to 3000 Oe) and more preferably from 191.0 to 214.9 kA/m (from 2200 to 2800 Oe).

The antimagnetic force (Hc) can be controlled depending on the particle size (tabular diameter and tabular thickness), the kind and the amount of the element contained therein, the substitution site of the element, the conditions for the particle formation reaction and so on.

The saturation magnetization ($\sigma$s) of the hexagonal ferrite powder is from 30 to 80 A m$^2$/kg (emu/g). Although a higher saturation magnetization ($\sigma$s) is preferred, the saturation magnetization ($\sigma$s) is liable to lower with a decrease in the particle size. It is well known that the saturation magnetization ($\sigma$s) can be improved by blending magnetoplanbite ferrite with spinel ferrite or appropriately selecting the kind and the amount of the element contained therein. It is also possible to employ a W type hexagonal ferrite. In dispersing the magnetic material, it has been a practice to treat the surface of magnetic material particles with a substance compatible with the dispersion medium and the polymer. As the surface-treating agent, an inorganic compound or an organic compound may be used. Typical examples thereof include oxides and hydroxides of Si, Al, P, etc., various silane coupling agents and various titanium coupling agents. The surface-treating agent is added in an amount of from 0.1 to 10% by mass based on the mass of the magnetic material. (In this specification, mass ratio is equal to weight ratio.) Also the pH value of the magnetic material is an important factor in the dispersion. Although the optimum pH value is usually in a range of from about 4 to about 12 depending on the dispersion medium and the polymer, a pH value of from about 6 to about 11 is selected by taking the chemical stability and preservation properties of the medium into consideration. Furthermore, the moisture contained in the magnetic material affects the dispersion. The water content is usually from 0.01 to 2.0%, though there is the optimum value depending on the dispersion medium and the polymer.

Examples of the method for producing the hexagonal ferrite powder include: (1) the glass crystallization method which comprises mixing and melting barium oxide, iron oxide, a metal oxide for substituting iron, and a glass-forming substance such as boron oxide at such a ratio as giving the desired ferrite composition, then quenching the mixture to give an amorphous product, heating it again and then washing and grinding to thereby give a barium ferrite crystal powder; (2) the hygrothermal reaction method which comprises neutralizing a solution of barium ferrite composition metal salts with an alkali, removing by-products, heating the residue in a liquid phase at 100° C. or higher, and then washing, drying and grinding to thereby give a barium ferrite crystal powder; (3) the coprecipitation method which comprises neutralizing a solution of barium ferrite composition metal salts with an alkali, removing by-products, treating the residue at 1100° C. or lower, and then grinding to thereby give a barium ferrite crystal powder; and so on, though the invention is not restricted to any method. If required, the hexagonal ferrite powder may be surface-treated with Al, Si, P or an oxide thereof, etc. The amount of the surface-treating agent is from 0.1 to 10% based on the ferromagnetic powder. It is preferable to conduct the surface treatment, since the adsorption of a lubricant such as a fatty acid can be thus regulated to 100 mg/m² or less. The ferromagnetic powder sometimes contain soluble inorganic ions such as Na, Ca, Fe, Ni and Sr. Although it is essentially preferable that the ferromagnetic powder is free from such ions, the characteristics thereof are not affected where the content of these ions is not more than 200 ppm.

[Magnetic Iron Nitride Powder]

In the case where a layer is formed on the surface of $Fe_{16}N_2$ particles, the average particle diameter of the $Fe_{16}N_2$ phase in magnetic iron nitride particles means individual $Fe_{16}N_2$ particles per se excluding the layer.

Although the magnetic iron nitride particles contain at least the $Fe_{16}N_2$ phase, it is preferably free from any other iron nitride phase. This is because the magnetic anisotropy of nitride crystals ($Fe_4N$ or $Fe_3N$ phase) is about $1 \times 10^5$ erg/cc, while the $Fe_{16}N_2$ phase has a high crystal magnetic anisotropy of 2 to $7 \times 10^6$ erg/cc. Owing to this characteristic, the $Fe_{16}N_2$ phase can sustain a high magnetic force even in the state of microparticles. This high crystal magnetic anisotropy can be established due to the crystalline structure of the $Fe_{16}N_2$ phase. namely, $Fe_{16}N_2$ crystals have a body-centered cubic structure wherein N atoms are regularly incorporated into the octahedral lattices of Fe. It is considered that the strain arising at the incorporation of the N atoms into the lattices would result in the high crystal magnetic anisotropy. The magnetization easy axis of the $Fe_{16}N_2$ phase is the C axis extended by nitriding.

It is preferable that the particles having the $Fe_{16}N_2$ phase are grain-shaped or ellipse-shaped and spherical particles are more preferable. Acicular particles are undesirable, since one of the three equivalent directions of an α-Fe cubic crystal is selected by nitriding and serves as the C axis (i.e., the magnetization easy axis) and, therefore, acicula-shaped particles involve both of particles having the major axis as the magnetization easy axis and particles having the minor axis as magnetization easy axis. Accordingly, the average axis ratio (major axis length/minor axis length) is preferably 2 or less (for example, from 1 to 2), more preferably 1.5 or less (for example, from 1 to 1.5).

The particle diameter is determined based on the particle diameter of iron particles before nitriding. A monodispersion is preferred, since a monodispersion generally suffers from lower medium noise. The particle diameter of a magnetic iron nitride-based powder having $Fe_{16}N_2$ as the main phase is determined based on the diameter of iron particles. It is preferable that the particle diameter of the iron particles is a monodispersion. This is because the extent of nitriding differs between large particles and small particles and thus magnetic characteristics are also different. From this point of view, it is also preferred that the particle diameter dispersion of the magnetic iron nitride-based powder is a monodispersion.

The particle diameter of the $Fe_{16}N_2$ phase, which is a magnetic material, is from 9 to 11 nm. At a smaller particle diameter, there arises a serious effect of heat fluctuation and the magnetic material becomes superparamagnetic, which makes it unsuitable for a magnetic recording medium. In this case, furthermore, the magnetic coercive force is elevated due to magnetic viscosity in high-speed recording at a head, which makes recording difficult. At a larger particle diameter, on the other hand, saturation magnetization cannot be lessened and thus the magnetic coercive force in recording is elevated, which also makes the recording difficult. Furthermore, a larger particle diameter results in an increase in the particle noise in the magnetic recording medium produced therefrom. It is preferable that the particle diameter dispersion is a monodispersion, since a monodispersion generally suffers from lower medium noise. The coefficient of variation in the particle diameter is 15% or less (preferably from 2 to 15%), more preferably 10% or less (preferably from 2 to 10%).

It is preferable that the surface of the magnetic iron nitride-based powder having $Fe_{16}N_2$ as the main phase is coated with an oxide film, since $Fe_{16}N_2$ microparticles are liable to be oxidized and, therefore, should be handled in a nitrogen atmosphere.

It is preferable that the oxide film contains an element selected from among rare earth elements and/or silicon and aluminum. Thus, the magnetic iron nitride-based powder has similar particle surface as the existing so-called metal particles comprising iron and Co as the main components and, therefore, becomes highly compatible with the steps of handling these metal particles. As the rare earth element, use may be preferably made of Y, La, Ce, Pr, Nd, Sm, Tb, Dy and Gd. From the viewpoint of dispersibility, Y is particularly preferred.

In addition to silicon and aluminum, the magnetic iron nitride-based powder may further contain boron or phosphorus if needed. Furthermore, it may contain, as an effective element, carbon, calcium, magnesium, zirconium, barium, strontium and so on. By using such an element together with the rare earth elements and/or silicon and aluminum, the shape-retention properties and the dispersion performance can be improved.

In the composition of the surface compound layer, the total amount of rare earth elements, boron, silicon, aluminum and phosphorus is preferably from 0.1 to 40.0% by atom, more preferably from 1.0 to 30.0% by atom and more preferably from 3.0 to 25.0% by atom based on iron. In the case where these elements are contained in an excessively small amount, the surface compound layer can be hardly formed and thus the magnetic anisotropy of the magnetic powder is lowered and the oxidation stability thereof is worsened. In the case there these elements are contained too much, the saturation magnetization is frequently lowered in excess.

The thickness of the oxide film preferably ranges from 1 to 5 nm, more preferably from 2 to 3 nm. When the thickness is smaller than the lower limit, the oxidation stability is frequently lowered. When it is larger than the upper limit, on the other hand, it is sometimes observed that the particle size can be hardly reduced in practice.

Concerning the magnetic characteristics of the iron nitride-based magnetic particles having $Fe_{16}N_2$ as the main phase, the magnetic coercive force (Hc) thereof is preferably from 79.6 to 318.4 kA/m (from 1,000 to 4,000 Oe), more preferably from 159.2 to 278.6 kA/m (from 2000 to 3500 Oe) and more preferably from 197.5 to 237 kA/m (from 2500 to 3000 Oe). This is because the effects by neighboring bits are enlarged at a lower Hc in in-plane recording, while recording becomes difficult in some cases at a higher Hc.

The saturation magnetization is preferably from 80 to 160 $Am^2$/kg (from 80 to 160 emu/g), more preferably from 80 to 120 $Am^2$/kg (from 80 to 120 emu/g). In the case where the saturation magnetization is too low, a signal becomes weak in some cases. When it is too high, on the other hand, the effects on neighboring bits are enlarged in, for example, in-plane recording and thus the medium becomes unsuitable for high-density recording. The squareness ratio preferably ranges from 0.6 to 0.9.

It is also preferable that the magnetic powder has a BET specific surface area of from 40 to 100 $m^2$/g. In the case where the BET specific surface area is too small, the particle size becomes larger and thus serious particle noise arises in using a magnetic recording medium. In this case, moreover, the surface smoothness of the magnetic layer is worsened and thus the reproduction output is lowered in many cases. In the case where the BET specific surface area is too large, on the other hand, the particles having the $Fe_{16}N_2$ phase are liable to aggregate. As a result, it becomes difficult to obtain a homogeneous dispersion and, in its turn, a smooth surface can be hardly obtained.

As described above, the average particle diameter of the iron nitride-based powder is 30 nm or less, preferably from 5 to 25 nm and more preferably from 10 to 20 nm.

To produce the iron nitride-based particles, use can be made of publicly known techniques, for example, a method disclosed by WO 2003/079332.

The magnetic particles produced by the above-described method can be appropriately used in a magnetic layer of magnetic recording media. Examples of the magnetic recording media include magnetic tapes such as video tapes and computer tapes, magnetic disks such as Floppy® disks and hard disks and so on.

[Binder]

To a binder, a lubricant, a dispersant, an additive, a solvent, a dispersion method and soon to be used in the magnetic layer and the nonmagnetic layer of the magnetic recording medium according to the invention, publicly known techniques for magnetic layers and nonmagnetic layers can be applied. In particular, publicly known techniques are applicable to the amount of a binder and the kind thereof, the amount of an additive or a dispersant to be added and the kind thereof.

Examples of the binder to be used in the invention include publicly known thermoplastic resins, thermosetting resins, reactive resins and mixture thereof. Examples of the thermoplastic resins include those having a glass transition temperature of −100° to 150° C., a number-average molecular weight of 1,000 to 200,000, preferably 10,000 to 100,000, and a polymerization degree of about 50 to about 1,000.

Examples of such thermoplastic resins include polymers or copolymers containing as constituent units vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal, vinyl ether, etc., polyurethane resins, and various rubber resins. Examples of the d thermosetting resins or reactive resins include phenol resin, epoxy resin, polyurethane hardening resin, urea resin, melamine resin, alkyd resin, acrylic reactive resin, formaldehyde resin, silicone resin, epoxy-polyamide resin, a mixture of polyester resin and isocyanate prepolymer, a mixture of polyester polyol and polyisocyanate, and a mixture of polyurethane and polyisocyanate. These resins are described in detail in *Purasuchikku Handobukku*, Asakura Shoten. Further, known electron radiation curing resins can be incorporated in the individual layers. Examples of these resins and methods of producing the same are described in detail in JP-A-62-256219. The above-described resins can be used either singly or in combination. Preferred examples of such a combination of resins include a combination of at least one selected from vinyl chloride resin, vinyl chloride-vinyl acetate copolymer, vinyl chloride-vinyl acetate-vinyl alcohol copolymer and vinyl chloride-vinyl acetate-maleic anhydride copolymer with a polyurethane resin, and a combination thereof with polyisocyanate.

Examples of the structure of polyurethane resins which can be used in the present invention include known structures such as polyester polyurethane, polyether polyurethane, polyether polyester polyurethane, polycarbonate polyurethane, polyester polycarbonate polyurethane and polycaprolactone polyurethane. To obtain better dispersibility and durability, it is preferable to select, from among the binders cited herein, those into which at least one polar group selected from —COOM, —SO$_3$M, —OSO$_3$M, —P=O(OM)$_2$, —O—P=O(OM)$_2$ (in which M represents a hydrogen atom or alkaline metal salt group), —OH, —NR$_2$, —N$^+$R$^3$ (in which R is a hydrocarbon group), epoxy group, —SH, —CN, and the like has been introduced by copolymerization or addition reaction. The amount of such a polar group is in the range of $10^{-1}$ to $10^{-8}$ mol/g, preferably $10^{-2}$ to $10^{-6}$ mol/g.

Specific examples of these binders used in the present invention include VAGH, VYHH, VMCH, VAGF, VAGD, VROH, VYES, VYNC, VMCC, XYHL, XYSG, PKHH, PKHJ, PKHC and PKFE (manufactured by Dow Chemical Co.), MPR-TA, MPR-TA5, MPR-TAL, MPR-TSN, MPR-TMF, MPR-TS, MPR-TM and MPR-TAO (manufactured by Nisshin Chemical Industry, Co., Ltd.), 1000W, DX80, DX81, DX82, DX83 and 100FD (manufactured by The Electro Chemical Industrial Co., Ltd.), MR-104, MR-105, MR110, MR100, MR555 and 400X-110A (manufactured by ZEON Corporation), Nippolan N2301, N2302 and N2304 (manufactured by Nippon Urethane), T-5105, T-R3080, T-5201, Barnok D-400 and D-210-80, and Crisbon 6109 and 7209 (manufactured by Dainippon Ink And Chemicals, Incorporated), Vylon UR8200, UR8300, UR-8700, RV530 and RV280 (manufactured by Toyobo Co., Ltd.), Difelamine 4020, 5020, 5100, 5300, 9020, 9022 and 7020 (manufactured by Dainichi Seika K.K.), MX5004 (manufactured by Mitsubishi Chemical Industries Ltd.), Sanprene SP-150 (manufactured by Sanyo Kasei K.K.), and Salan F310 and F210 (manufactured by Asahi Chemical Industry Co., Ltd.).

The content of the binder to be contained in the nonmagnetic layer and the magnetic layer of the present invention is normally in the range of 5 to 50% by mass, preferably 10 to 30% by mass based on the nonmagnetic powder or the magnetic powder. In the case of using a vinyl chloride resin, its content is preferably in the range of 5 to 30% by mass. In the case of using a polyurethane resin, its content is preferably in the range of 2 to 20% by mass. In the case of using a polyisocyanate, its content is preferably in the range of 2 to 20% by mass. These binder resins are preferably used in these amounts in combination. In the case where head corrosion arises due to a small amount of dechlorination, it is also possible to use polyurethane alone or a combination of polyurethane with isocyanate. In the case of using polyurethane in the invention, its glass transition temperature ranges from −50° to 150° C., preferably from 0° to 100° C., its breaking extension preferably range from 100 to 2,000%, its breaking stress preferably ranges from 0.05 to 10 kg/mm$^2$ (0.49 to 98 MPa) and its yield point e preferably ranges from 0.05 to 10 kg/mm$^2$ (0.49 to 98 MPa).

Examples of polyisocyanates which can be used in the present invention include isocyanates such as tolylene diisocyanate, 4-4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, products of the reaction of these isocyanates with polyalcohols, and polyisocyanates produced by the condensation of isocyanates. Examples of the trade names of these commercially available isocyanates include Colonate L, Colonate HL, Colonate 2030, Colonate 2031, Millionate MR and Millionate MTL (manufactured by Nippon Polyurethane Industry Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer). These isocyanates may be used singly. Alternatively, by utilizing the difference in hardening reactivity, two or more of these isocyanates can be used in combination in both the individual layers.

The magnetic layer according to the invention may further contain additive(s), if needed. Examples of the additives include an abrasive, a lubricant, a dispersant/dispersion aid, a mildewproofing agent, an antistatic agent, an antioxidative agent, a solvent, carbon black and so on. As these examples, use can be made of, for example, molybdenum disulfide, tungsten disulfide, graphite, boron nitride, fluorinated graphite, silicone oil, silicone having a polar group, aliphatic acid-modified silicone, fluorine-containing silicone, fluorine-containing alcohol, fluorine-containing ester, polyolefin, polyglycol, polyphenyl ether, aromatic cycle-containing organic phosphonic groups such as phenylphosphonic acid, benzylphosphonic acid, phenethylphosphonic acid, α-methylbenzylphosphonic acid, 1-methyl-1-phenethylphosphonic acid, diphenylmethylphosphonic acid, biphenylphosphonic acid, benzylphenylphosphonic acid, α-cumylphosphonic acid, tolylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid and nonylphenylphosphonic acid and alkali metal salts thereof, alkylphosphonic acids such as octylphosphonic acid, 2-ethylhexylphosphonic acid, isooctylphosphonic acid, isononylphosphonic acid, isodecylphosphonic acid, isoundecylphosphonic acid, isododecylphosphonic acid, isohexadecylphosphonic acid, isooctadecylphosphonic acid and isoeicosylphosphonic acid and alkali metal salts thereof, aromatic phosphoric acid esters such as phenyl phosphate, benzyl phosphate, phenethyl phosphate, α-methylbenzyl phosphate, 1-methyl-1-phenethyl phosphate, diphenylmethyl phosphate, biphenyl phosphate, benzylphenyl phosphate, α-cumyl phosphate, tolyl phosphate, xylyl phosphate, ethylphenyl phosphate,cumenyl phosphate, propylphenyl phosphate, butylphenyl phosphate, heptylphenyl phosphate, octylphenyl phosphate and nonylphenyl phosphate and alkali metal salts thereof, alkyl phosphoric acid esters such as octyl phosphate, 2-ethylhexyl phosphate, isooctyl phosphate, isononyl phosphate, isodecyl phosphate, isoundecyl phosphate, isododecyl phosphate, isohexadecyl phosphate, isooctadecyl phosphate and isoeicosyl phosphate and alkali metal salts thereof, alkyl sulfonates and alkali metal salts thereof, fluorinated alkyl sulfates and alkali metal salts thereof, monobasic fatty acids having from 10 to 24 carbon atoms (which may contain an unsaturated bond or may be branched) such as lauric acid, myristic acid, palmitic acid, stearic acid, behenic acid, butyl stearate, oleic acid, linoleic acid, linolenic acid, elaidic acid and erucic acid and alkali metal salts thereof, monofatty acid esters, difatty acid esters or trifatty acid esters of a monobasic aliphatic acid, which has 10 to 24 carbon atoms, may contain an unsaturated bond and may be branched, with one of a mono- to hexavalent alcohol, which has 2 to 22 carbon atoms, may contain an unsaturated bond and may be branched, an alkoxy alcohol or a monoalkyl ether of an alkylene oxide polymer, which has 12 to 22 carbon atoms, may contain an unsaturated bond and may be branched, such as butyl stearate, octyl stearate, amyl stearate, isooctyl stearate, octyl myristate, butyl laurate, butoxyethyl stearate, anhydro sorbitan monostearate, anhydro sorbitan tristearate and so on, fatty acid amides having 2 to 22 carbon atoms and aliphatic amines having 8 to 22 carbon atoms. In addition to the hydrocarbon groups cited above, use may be made of those having an alkyl group, an aryl group or an aralkyl group substituted by a group other than a hydrocarbon group, for example, a nitro group or a halogenated hydrocarbon such as F, Cl, Br, $CF_3$, $CCl_3$ or $CBr_3$.

Further, use can be made of nonionic surfactants based on, for example, as alkylene oxide, glycerin, glycidol and alkylphenolethylene oxide addition products; cationic surfactants such as cyclic amines, ester amides, quaternary ammonium salts, hydantoin derivatives, heterocyclic compounds, phosphoniums and sulfoniums; anionic surfactants containing acidic groups such as carboxylate, sulfonate and sulfuric ester; amphoteric surfactants such as amino acids, aminosulfonic acids, sulfuric or phosphoric esters of amino alcohols and alkylbetaines, etc. can be used. These surfactants are described in greater detail in *Kaimen Kasseizai Binran*, Sangyo Tosho K.K.

These lubricants, antistatic agents, etc. may not be necessarily 100% pure but may contain impurities such as an isomer, an unreacted material, a by-product, a decomposition product and an oxide. The content of these impurities is preferably 30% by mass or less, more preferably 10% by mass or less.

Specific examples of these additives include NAA-102, castor hardened aliphatic acid, NAA-42, Cation SA, Nymean L-201, Nonion E-208, Anon BF and Anon LG (manufactured by NOF Corporation), FAL-205 and FAL-123 (manufactured by TAKEMOTO OIL & FAT Co.), Enujelb OL (manufactured by New Japan Chemical Co., Ltd.), TA-3 (manufactured by The Shin-Etsu Chemical Industry Co., Ltd.), Armide P (manufactured by Lion), Duomine TDO (manufactured by The Lion Fat and Oil Co., Ltd.), BA-41G (manufactured by The Nisshin Oillio Group, Ltd.), Profan 2012E, New Pole PE61, Ionet MS-400 (manufactured by Sanyo Chemical Industries, Ltd.) and so on.

If necessary, a carbon black may be incorporated in the magnetic layer in the invention. Examples of the carbon black usable in the magnetic layer include furnace black for rubber, thermal black for rubber, acetylene black, and so on. The carbon black preferably has a specific surface area of 5 to 500 $m^2/g$, a DBP oil absorption of 10 to 400 ml/100 g, a particle diameter of 5 to 300 nm, a pH value of 2 to 10, a water content of 0.1 to 10% and a tap density of 0.1 to 1 g/ml.

Specific examples of the carbon black employable in the present invention include BLACKPEARLS 2000, 1300, 1000, 900, 905, 800, 700 and VULCAN XC-72 (manufactured by Cabot Corp.), #80, #60, #55, #50 and #35 (manufactured by Asahi Carbon Co., Ltd.), #2400B, #2300, #900, #1000, #30, #40 and #10B (manufactured by Mitsubishi Chemical Corp.), CONDUCTEX SC, RAVEN 1500, 50, 40, 15 and RAVEN-MT-P (manufactured by Columbia Carbon Corp.), and Ketchen Black EC (manufactured by Ketchen Black International Co.). Such a carbon black may be surface-treated with a dispersant, grafted with a resin or partially graphtized before using. Before adding to a magnetic coating, the carbon black may be dispersed by using a binder. Either a single carbon black or a combination thereof may be used. In the case of using the carbon black, the amount thereof is preferably from 0.1 to 30% by mass based on the mass of the magnetic material. The carbon blacks have effects of, for example, preventing the magnetic layer from static electrification, lowering coefficient of friction, shading, and enhancing film strength. These effects vary from carbon black to carbon black. Accordingly, it is possible in the magnetic layer and the nonmagnetic layer of the invention to select these carbon blacks of appropriate kinds, amounts and combinations so as to establish the desired purpose depending on the properties as discussed above (i.e., particle size, oil absorption, electrical conductivity, pH, etc.). In other words, an optimum combination of carbon blacks should be selected for each layer. For the details of the carbon black employable in the present invention, reference can be made to *Kabon Burakku Binrann*, Carbon Black Kyokai.

[Abrasive]

As the abrasives to be used in the present invention, use can be made of α-alumina having a percent alpha conversion of 90% or higher, β-alumina, silicon carbide, chromium oxide, cerium oxide, α-iron oxide, corundum, artificial diamond, silicon nitride, silicon carbide, titanium carbide, titanium oxide, silicon dioxide and boron nitride. In general, known materials having a Mohs hardness of 6 or above can be used singly or in combination. Also, use may be made of a composite material made of these abrasives (abrasive surface-treated with another abrasive) therefor. These abrasives sometimes contain compounds or elements other than the main component but similar effects can be established so far as the content of the main component is not less than 90%. The particle size of these abrasives is preferably in the range of 0.01 to 2 μm. To enhance the electromagnetic conversion properties, a narrower particle size distribution is preferred. If necessary, a plurality of abrasives having different particle sizes may be used in combination to improve durability. Alternatively, a similar effect can be established by using a single abrasive having a wider particle diameter distribution. The tap density of these abrasives preferably ranges from 0.3 to 2 g/cc. The water content of these abrasives preferably ranges from 0.1 to 5%. The pH value of these abrasives preferably ranges from 2 to 11. The specific surface area of these abrasives preferably ranges from 1 to 30 $m^2/g$. Although the abrasive to be used in the present invention may be in the form of aciculas, spheres, cubes or tablets, it is preferable to employ an abrasive having edges partially on the surface thereof so as to establish a high abrasion. Specific examples thereof include AKP-12, AKP-15, AKP-20, AKP-30, AKP-50, HIT-20, HIT-30, HIT-55, HIT-60, HIT-70, HIT-80 and HIT-100 (manufactured by Sumitomo Chemical Co., Ltd.), ERC-DBM, HP-DBM and HPS-DBM (manufactured by Reynolds International Inc.), WA10000 (manufactured by Fujimi Kenma K.K.), UB20 (manufactured by Uemura Kogyo K.K.), G-5, Chromex U2 and Chromex U1 (manufactured by Nippon Chemical Industrial Co., Ltd.), TF100 and TF140 (manufactured by Toda Kogyo Co., Ltd.), beta-Random and Ultrafine (manufactured by Ividen Co., Ltd.) and B-3 (manufactured by Showa Mining Co., Ltd.). These abrasives may be added to the nonmagnetic layer, if necessary. By adding such an abrasive to the nonmagnetic layer, it is possible to control the surface figure or prevent abrasives from protruding. Needless to say, the particle diameters and amounts of abrasives to be added to the magnetic layer and the nonmagnetic layer should be selected independently at optimal values.

In the invention, it is preferable to use diamond particles having an average diameter of 100 nm or less as an abrasive. The average diameter is preferably from 5 to 80 nm, more preferably from 10 to 50 nm. By using these diamond particles having an average diameter of 100 nm or less, the arithmetic average of phase difference according to the invention can be easily established. Moreover, a medium excellent in high-density recording characteristics, run durability and head wear can be thus provided. It is preferable to add the diamond particles in an amount of from 0.05 to 5% by mass, more preferably from 0.5 to 3% by mass, based on the ferromagnetic powder.

As the organic solvent to be used in the invention, use can be made of publicly known ones. Examples of the organic solvents which can be used in the present invention include ketones such as acetone, methyl ethyl ketone, methyl isobutyl ketone, diisobutyl ketone, cyclohexanone, isophorone and tetrahydrofuran, alcohols such as methanol, ethanol, propanol, butanol, isobutyl alcohol, isopropyl alcohol and methyl cyclohexanol, esters such as methyl acetate, butyl acetate, isobutyl acetate, isopropyl acetate, ethyl lactate and glycol acetate, glycol ethers such as glycol dimethyl ether, glycol monoethyl ether and dioxane, aromatic hydrocarbons such as benzene, toluene, xylene, cresol and chlorobenzene, chlorinated hydrocarbons such as methylene chloride, ethylene chloride, carbon tetrachloride, chloroform, ethylene chlorohydrin and dichlorobenzene, N,N-dimethylformamide, and hexane. These organic solvents may be used in any proportions.

These organic solvents are not necessarily 100% pure and may contain impurities such as isomers, unreacted matters, side reaction products, decomposition products, oxides and water besides main components. The content of these impurities is preferably 30% or less, more preferably 10% or less. In the present invention, it is preferable that the same kind of organic solvents are used in the magnetic layer and the nonmagnetic layer, though the amounts thereof may be different. A solvent having a high surface tension (e.g., cyclohexanone, dioxane) may be used for the nonmagnetic layer to enhance the coating stability. Specifically, it is desirable that the arithmetic mean of the solvent composition for the upper layer is not smaller than that of the solvent composition for the nonmagnetic layer. In order to enhance the dispersibility, it is preferable to employ an organic solvent having a high polarity. It is preferable that, in the solvent composition, a solvent having a dielectric constant of 15 or higher is contained in an amount of 50% or more. The solubility parameter of these solvents is preferably from 8 to 11.

If necessary, the kinds and amounts of these dispersants, lubricants and surface active agents to be used in the present invention may be varied between the magnetic layer and the nonmagnetic layer as will be discussed hereinafter. For example, a dispersant would be bonded or adsorbed at a polar group. Thus, it is mainly adsorbed by or bonded to the surface of the ferromagnetic metal powder in the magnetic layer and to the surface of the nonmagnetic powder in the nonmagnetic layer via the polar group. It appears that an organophosphorus compound once adsorbed is hardly detached from the surface of a metal or a metal compound. In the invention, therefore, the ferromagnetic metal powder surface or the nonmagnetic powder surface is in the state of being coated with an alkyl group, an aromatic group, etc., which improves the affinity of the ferromagnetic metal powder or the nonmagnetic powder to a binder component. Moreover, the dispersion stability of the ferromagnetic metal powder or the nonmagnetic powder is improved thereby. On the other hand, a lubricant exists in the free state. Thus, it is possible to use fatty acids having different melting points in the nonmagnetic layer and the magnetic layer to thereby regulate the oozing thereof to the surface; to use esters having different boiling points or polarities to thereby regulate the oozing thereof to the surface; to control the amounts of surface active agents to thereby improve the coating stability; and to use a lubricant in an increased amount in the nonmagnetic layer to thereby improve the lubricating effect. The additives to be used in the present invention may be entirely or partially added at any steps during the process of producing the coating solutions for the magnetic layer or the nonmagnetic layer. For example, these additives may be with the ferromagnetic powder before kneading. Further, these additives may be added to the system at the step of kneading the ferromagnetic powder with a binder and a solvent. Alternatively, these additives may be added to the system during or after the dispersion step or immediately before the coating step.

[Nonmagnetic Layer]

Next, the nonmagnetic layer will be described in greater detail. The magnetic recording medium according to the invention may have a nonmagnetic layer containing a nonmagnetic powder and a binder on the nonmagnetic support. The nonmagnetic powder to be used in the nonmagnetic layer is either an inorganic material or an organic material. It is also possible to use carbon black, etc. Examples of the inorganic material include a metal, a metal oxide, a metal carbonate, a metal sulfate, a metal nitride, a metal carbide, a metal sulfide and so on.

Specific examples thereof are selected from the following compounds and they can be used either alone or in combination, e.g., titanium oxide such as titanium dioxide, cerium oxide, tin oxide, tungsten oxide, ZnO, $ZrO_2$, $SiO_2$, $Cr_2O_3$, α-alumina having an α-conversion rate of 90% to 100%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $SrCO_3$, $BaSO_4$, silicon carbide and titanium carbide. Among all, α-iron oxide and titanium oxide are preferred.

The figure of nonmagnetic powder may be any of acicular, spherical, polyhedral and tabular shapes. The average crystalline size of the nonmagnetic powder is preferably from 4 nm to 500 nm, more preferably from 40 to 100 nm. It is preferable that the crystalline size falls within the range of 4 nm to 500 nm, since an appropriate surface roughness can be achieved without interfering the dispersion. The average particle diameter of these nonmagnetic powder is preferably from 5 nm to 500 nm. A plurality of nonmagnetic powders each having a different particle diameter may be combined, if necessary, or a single nonmagnetic powder having a broad particle diameter distribution may be employed so as to attain the same effect as such a combination. A particularly preferred particle diameter of nonmagnetic powder is from 10 to 200 nm. It is preferable that the average particle diameter of the nonmagnetic powders falls within the range of 5 nm to 500 nm, since dispersion can be favorably conducted and an appropriate surface roughness can be obtained thereby.

The specific surface area of the nonmagnetic powder to be used in the present invention is from 1 to 150 $m^2$/g, preferably from 20 to 120 $m^2$/g, and more preferably from 50 to 100 $m^2$/g. It is preferable that the specific surface area falls within the range of 1 to 150 $m^2$/g, since an appropriate surface roughness can be achieved and dispersion can be made by using the binder in a desired amount in this case. The oil absorption amount using DBP (dibutyl phthalate) thereof is from 5 to 100 ml/100 g, preferably from 10 to 80 ml/100 g, and more preferably from 20 to 60 ml/100 g. The specific gravity thereof is from 1 to 12, and preferably from 3 to 6. The tap density of is from 0.05 to 2 g/ml, preferably from 0.2 to 1.5 g/ml. So long as the tap density falls within the scope of 0.05 to 2 g/ml, few particles scatter and thus the nonmagnetic powder can be easily handled. Moreover, it scarcely sticks to a device in this case. The pH value of the nonmagnetic powder is preferably from 2 to 11, more preferably from 6 to 9. So long as the pH value falls within the range of 2 to 11, the coefficient of friction would not be elevated due to high temperature, high humidity or leaving fatty acids. The water content of the nonmagnetic powder is from 0.1 to 5% by mass, preferably from 0.2 to 3% by mass and more preferably from 0.3 to 1.5% by mass. It is preferable that the water content falls within the range of 0.1 to 5% by mass, since favorable dispersion can be achieved and stable coating viscosity can be obtained after the dispersion in this case. The ignition loss thereof is preferably 20% by mass or less and a smaller ignition loss is preferred.

In the case where the nonmagnetic powder is an inorganic powder, the Mohs' hardness thereof is preferably from 4 to 10. So long as the Mohs' hardness falls within the range of 4 to 10, a high durability can be ensured. The stearic acid adsorption amount of the nonmagnetic powder is from 1 to 20 μmol/$m^2$, preferably from 2 to 15 μmol/$m^2$. The heat of wetting of the nonmagnetic powder in water at 25° C. is preferably from 200 to 600 erg/$cm^2$ (200 to 600 mJ/$m^2$). Also, use can be made of a solvent having a heat of wetting within this range. The water molecule amount on the surface at 100 to 400° C. is appropriately from 1 to 10 molecules/100 Å. The isoelectric point thereof in water is preferably from 3 to 9. It is preferable that the nonmagnetic powder is surface-coated so that there is $Al_2O_3$, $SiO_2$, $TiO_2$, $ZrO_2$, $SnO_2$, $Sb_2O_3$ or ZnO. $Al_2O_3$, $SiO_2$, $TiO_2$ and $ZrO_2$ are particularly preferable and $Al_2O_3$, $SiO_2$ and $ZrO_2$ are more preferable. Either one of these compounds or a combination thereof may be used. Furthermore, use can be made of a surface treated layer formed by coprecipitation, if necessary. Alternatively, surface treatment of particles may be previously performed with alumina in the first place, then the alumina-coated surface may be treated with silica, or vice versa. A surface treated layer may be porous, if necessary, thought a homogeneous and dense surface is generally preferred.

Specific examples of the nonmagnetic powder to be used in the nonmagnetic layer in the invention include Nanotite (manufactured by Showa Denko Co., Ltd.), HIT-100 and ZA-G1 (manufactured by Sumitomo Chemical Co., Ltd.), DPN-250, DPN-250BX, DPN-245, DPN-270BX, DPB-550BX and DPN-550RX (manufactured by Toda Kogyo Co., Ltd.), titanium oxide TTO-51B, TTO-55A, TTO-55B, TTO-55C, TTO-55S, TTO-55D, SN-100, MJ-7, α-iron oxide E270, E271 and E300 (manufactured by Ishihara Sangyo Kaisha K.K.), STT-4D, STT-30D, STT-30 and STT-65C (manufactured by Titan Kogyo Co., Ltd.), MT-100S, MT-100T, MT-150W, MT-500B, MT-600B, T-100F and T-500HD (manufactured by Teika Co., Ltd.), FINEX-25, BF-1, BF-10, BF-20 and ST-M (manufactured by Sakai Chemical Industry Co., Ltd.), DEFIC-Y and DEFIC-R (manufactured by Dowa Mining Co., Ltd.), AS2BM and $TiO_2$ P25 (manufactured by Nippon Aerosil Co., Ltd.), and 100A, and 500A (manufactured by Ube Industries, Ltd.), Y-LOP (manufactured by Titan Kogyo Co., Ltd.) and calcined products of them. Particularly preferred nonmagnetic powders are titanium dioxide and alpha-iron oxide.

By incorporating carbon blacks into the nonmagnetic layer, a desired micro Vickers' hardness can be obtained in addition to the effects of reducing surface electrical resistance and light transmittance. The micro vickers hardness of the nonmagnetic layer is usually from 25 to 60 kg/$mm^2$ (245 to 588 MPa), preferably from 30 to 50 kg/$mm^2$ (294 to 490 MPa) for improving the smoothness in the contact with the head. The micro vickers hardness can be measured by using a thin film hardness tester (Model HMA-400 manufactured by NEC Corp.). The tip of the penetrator used is a triangular pyramid made of diamond with a tip sharpness of 80° and a tip radius of 0.1 μm. The measurement procedure is described in detail in *Hakumaku no Rikigakuteki Tokusei Hyouka Gijutu*, Realize Corp. Concerning light transmittance, it is generally specified that the absorption of infrared rays of about 900 nm in wavelength is 3% or less. In the case of a VHS magnetic tape, for example, the absorption thereof is standardized as 9.8% or less. To satisfy this requirement, use can be made of furnace black for rubber, thermal black for rubber, acetylene black, and so on.

The carbon black to be used in the nonmagnetic layer of the invention preferably has a specific surface area of 100 to 500 m²/g, more preferably 150 to 400 m²/g, and an oil absorption of 20 to 400 ml/100 g, more preferably 30 to 200 ml/100 g as determined with DBP. The carbon black has an average particle diameter of 5 to 80 nm, more preferably 10 to 50 nm, particularly preferably 10 to 40 nm. The carbon black preferably has a pH value of 2 to 10, a water content of 0.1 to 10% and a tap density of 0.1 to 1 g/ml.

Specific examples of the carbon black that is usable in the nonmagnetic layer of the invention include BLACKPEARLS 2000, 1300, 1000, 900, 800, 880 and 700, VULCAN XC-72 (manufactured by Cabot Corp.), #3050B, #3150B, #3250B, #3750B, #3950B, #950, #650B, #970B, #850B and MA-600 (manufactured by Mitsubishi Kasei Corp.), CONDUCTEX SC, RAVEN 8800, 8000, 7000, 5750, 5250, 3500, 2100, 2000, 1800, 1500, 1255 and 1250 (manufactured by Columbia Carbon Corp.), and Ketchen Black EC (manufactured by Aczo Corp.).

These carbon blacks may be surface-treated with a dispersant, grafted with a resin or partially graphtized before using. These carbon blacks may be dispersed by using a binder before adding to the coating. These carbon blacks may be used in an amount not exceeding 50% by mass based on the mass of the foregoing inorganic powder or not exceeding 40% by mass based on the total mass of the nonmagnetic layer. These carbon blacks may be used singly or in combination. For the details of the carbon black usable in the nonmagnetic layer of the present invention, reference can be made to *Kabon Burakku Binran*, edited by Kabon Burakku Kyokai.

Further, an organic powder may be added to the nonmagnetic layer depending on the purpose. Examples of the organic powder include an acryl styrene-based resin powder, a benzoguanamine resin powder, a melamine-based resin powder and a phthalocyanine-based pigment. Use can be also made of a polyolefin-based resin powder, a polyester-based resin powder, a polyamide-based resin powder, a polyimide-based resin powder, and a polyfluoroethylene resin. To prepare these organic powders, use can be made of a methods described in JP-A-62-18564 and JP-A-60-255827.

For the binder, lubricant, dispersant, and additives to be incorporated in the nonmagnetic layer and the method for dispersing these components and solvents used therefor, those used for the magnetic layer can be employed. In particular, for the amount and kind of the binder, additives and dispersant, the publicly known technique for the magnetic layer can be employed.

The magnetic recording medium according to the invention may be further provided with an undercoating layer. By forming the undercoating layer, the adhesive force between the support and the magnetic layer or the nonmagnetic layer can be improved. As the undercoating layer, a polyester resin soluble in solvents may be employed.

[Layer Constitution]

Concerning the thickness constitution of the magnetic recording medium of the present invention, the thickness of the nonmagnetic layer is from 3 to 80 μm, preferably from 3 to 50 μm and particularly preferably from 3 to 10 μm as discussed above. In the case where an undercoating layer is provided between the nonmagnetic support and the nonmagnetic layer, the thickness of the undercoating layer is from 0.01 to 0.8 μm, preferably from 0.02 to 0.6 μm.

The thickness of the magnetic layer can be optimally selected according to the saturation magnetization amount of the magnetic head used, the head gap length, and the recording signal zone, and is preferably from 10 to 150 nm, more preferably from 20 to 120 nm and more preferably from 30 to 100 nm. The variation in the thickness of the magnetic layer is preferably within ±50%, more preferably within ±30%.

The magnetic layer may comprise at least one layer. It may comprise two or more layers having different magnetic characteristics and well-known multilayer magnetic layer structures can be applied to the present invention.

The thickness of the nonmagnetic layer according to the present invention is generally from 0.1 to 3.0 μm, preferably from 0.3 to 2.0 μm, and more preferably from 0.5 to 1.5 μm. The nonmagnetic layer in the present invention exhibits the effect of the present invention so long as it is substantially nonmagnetic even if, or intentionally, it contains a small amount of a magnetic powder as an impurity, which is as a matter of course regarded as essentially the same construction as in the present invention. The term "essentially the same" means that the residual magnetic flux density of the nonmagnetic layer is 10 mT or less or the antimagnetic force of the nonmagnetic layer is 7.96 kA/m (100 Oe), preferably the residual magnetic flux density and the antimagnetic force are zero.

[Back Layer]

It is preferable that the magnetic recording medium of the invention has a backcoat layer formed on the other face of the nonmagnetic support. The backcoat layer preferably contains carbon black and an inorganic powder. As the binder and various additives to be added, the formulations for the magnetic layer and the nonmagnetic layer are applicable. The thickness of the backcoat layer is preferably 0.9 μm or less, more preferably from 0.1 to 0.7 μm.

[Production Method]

The process for producing a coating composition for the magnetic layer, a coating composition for the nonmagnetic layer or a coating composition for the backcoat layer to be used in the present invention comprises at least a kneading step, a dispersion step, and a mixing step which is optionally provided before or after these steps. The steps for producing a coating composition for the magnetic layer or a coating composition for the nonmagnetic layer each may consist of two or more stages. All of the raw materials may be added to the system at the beginning or during any step. It is also possible to add each of these raw materials in portions to the system at two or more steps. For example, polyurethane may be supplied in portions into the system at the kneading step, the dispersion step or the mixing step for the viscosity adjustment following dispersion. In order to accomplish the objects of the present invention, use can be made of a publicly known production technique as one of the steps. To disperse a coating composition for the nonmagnetic layer or a coating composition for the backcoat layer, use can be made of glass beads. As these glass beads, zirconia beads, titania beads and steel beads which are dispersion media having a high specific gravity are preferably used. The particle diameter and packing ratio of these dispersion media may be optimized before using. As a dispersion machine, a publicly known one may be used.

The production method according to the invention is characterized by the method of preparing a coating composition for the magnetic layer. That is to say, the characteristic resides in that an arithmetic average of phase difference, which is measured using a tapping mode AFM, of from 2 to 20° is achieved by separately dispersing a magnetic solution containing a ferromagnetic powder and a binder and an abrasive solution containing an abrasive, then mixing the magnetic solution with the abrasive solution, and subjecting the liquid mixture thus obtained to both of an air-bubbling treatment and an ultrasonication treatment.

The solid concentration of the coating composition for magnetic layer is preferably from 5 to 25% by mass, more preferably from 5 to 15% by mass. At a high solid concentration, the interparticle distance is short and thus the air-bubbling becomes difficult. At a low solid concentration, on the other hand, air bubbles are liable to unite together and thus the air content of the liquid is lowered.

The abrasive solution usually contains an abrasive and an organic solvent. The concentration of the abrasive in the abrasive solution is preferably from 5 to 20% by mass.

In the invention wherein an abrasive having an average particle diameter of 100 nm or less is used, it is still preferable that the abrasive concentration is from 5 to 10% by mass.

At a high solid concentration, the interparticle distance is short and thus the air-bubbling becomes difficult. At a low solid concentration, on the other hand, air bubbles are liable to unite together and thus the air content of the liquid is lowered. In this case, moreover, ultrasonic waves (puncture of cavities) strike particles under aggregation at only a lowered possibility and thus circulation should be conducted at an elevated frequency, which worsens the productivity.

In the treatment of separately dispersing the magnetic solution containing a ferromagnetic powder and a binder and the abrasive solution containing an abrasive, a dispersion treatment using, for example, a bead mill dispersion machine can be employed for dispersing the magnetic solution. In this step, an air-bubbling treatment may be conducted too. To disperse the abrasive solution, it is preferable to employ a first step with the use of a batch type ultrasonic dispersion device and a second step with the use of a circulation type ultrasonic dispersion device. These dispersion treatments are disclosed in JP-A-2005-228369. Anyway, it is desirable that the dispersion of the magnetic solution and the abrasive solution is carried out to such an extent as surely disintegrating the particle aggregates.

After mixing the magnetic solution with the abrasive solution, the liquid mixture thus obtained is subjected to an air-bubbling treatment and an ultrasonication treatment. By the air-bubbling treatment, cavities should be sufficiently formed on the surface layer of the magnetic layer to be formed. This can be accomplished by, for example, using a high-speed stirrer having stirring blades such as a dissolver stirrer and stirring the mixture at a stirring blade peripheral speed of 10 m/sec or higher for 5 minutes or longer. It is preferable that the product (Vt: m/sec×sec) of stirring blade peripheral speed (V) and stirring time (t) ranges from 3000 to 30000 (m). At a smaller Vt, little air-bubbling occurs and, in its turn, a sufficient effect cannot be achieved. When Vt exceeds the upper limit as specified above, on the other hand, the air content cannot be elevated any longer within a certain treatment time and, therefore, the production efficiency is lowered. Dispersion stability can be improved by setting the stirring blade peripheral speed at a higher level. Therefore, it is assumed that the air bubble size in the liquid is also reduced by combining the air-bubbling treatment with the ultrasonication treatment. It is therefore preferable to employ a stirring blade peripheral speed V of from 10 to 50 m/sec. When the treatment is conducted at room temperature under atmospheric pressure, it is preferable to control the stirring time so that the product Vt falls within the range as specified above. In the case of employing, for example, elevated pressure, Vt can be shortened. At a stirring blade peripheral speed of 20 m/sec or lower, it is possible to use a high-speed stirrer such as a dissolver stirrer or a homogenizer. When the stirring blade peripheral speed exceeds 20 m/sec, it is preferable from the viewpoint of energy transfer to use a high-speed rotary thin layer stirrer (a fill mix).

Due to this stirring treatment, cavities can be sufficiently formed in the surface layer of the magnetic layer to be formed.

At the same time, the requirement for the range of the arithmetic average of phase difference as specified in the invention can be satisfied thereby.

Although the ultrasonication treatment may be performed simultaneously with the stirring treatment, it is preferable to perform the ultrasonication treatment after the completion of the stirring treatment. As an ultrasonication apparatus, use can be made of a publicly known one. For example, it is possible to employ a flow type ultrasonic dispersion machine whereby ultrasonic waves are applied on a flowing fluid. The ultrasonication treatment is carried out preferably under, for example, the following conditions. Frequency: 15 to 20 kHz; amplitude: 20 to 60 µm; irradiation area: 36 to 50 mm in diameter; irradiation distance: 1 to 4 mm; retention time at irradiation volume (irradiation area×irradiation distance) 0.02 to 5 sec, more preferably from 0.08 to 2 sec.

It is preferable to employ multiple liquid-feeding lines or a circulatory liquid-feeding line(s) in the flow type ultrasonic dispersion machine to thereby control the total retention time of the liquid passing through the irradiation volume within the range as specified above.

When the retention time is shorter than the level as defined above, the effect of disintegrating particles by the ultrasonic dispersion is worsened and particle size of additives (the abrasive and carbon black) becomes irregular at the micron order. When the retention time is too long, on the other hand, the phase difference as specified in the invention (in particular, cavities formed by phase lag) can be hardly achieved. It appears that this phenomenon is caused since cavitation arises in passing pipe(s), in addition to the cavitation during the ultrasonic dispersion, and the charge states on the surface of the particles of the abrasive, carbon black and so on are thus changed, thereby promoting the adsorption of the air by the powder surface. With an increase in the flow rate, the ultrasonic irradiation time is shortened and, in its turn, an increase in the temperature of the liquid under the treatment can be prevented. It is considered that this point also contributes to the incorporation of air into the liquid under the treatment.

It is preferable in the invention to further disperse the carbon black alone in the magnetic solution. More specifically speaking, it is desirable that a carbon black solution containing from 5 to 30% by mass of carbon black in an organic solvent is prepared. Then, it is dispersed using a bead mill to disintegrate the aggregated particles. The dispersion thus obtained is subjected to the air-bubbling treatment followed by the ultrasonication treatment. It is preferable that the solid concentration of carbon black is appropriately controlled within the range as specified above depending on the average particle diameter of the carbon black employed. Namely, the solid concentration of the liquid is lowered with a decrease in the particle diameter by taking the interparticle distance into consideration. When the solid concentration is less than the lower limit as specified above, however, air can be hardly incorporated and the dispersion stability is worsened. When it exceeds the upper limit, on the other hand, it is sometimes observed that the liquid shows an increase in viscosity during the bead mill dispersion treatment or the procedure of adding carbon black to an organic solvent using an ultrasonic dispersion machine provided with stirring blades and liquefying the same cannot be sufficiently carried out.

The air-bubbling treatment and the ultrasonication treatment may be conducted under the conditions as described above. After the completion of the dispersion of carbon black, the magnetic solution and the abrasive solution are mixed with it. Subsequently, the liquid mixture thus obtained is subjected to both of the air-bubbling treatment and the ultrasonication treatment as described above to thereby give a coating solution for magnetic layer.

It is considered that extremely fine bubbles (nanobubbles) can be incorporated into the coating solution for magnetic layer by using both of the air-bubbling treatment and the ultrasonication treatment as described above. It is also considered that the charge states on the powder surface are changed by the ultrasonication treatment and thus the nanobubbles are adsorbed on the powder surface. Accordingly, it seems that the dispersion stability of the powder containing the ferromagnetic powder can be remarkably improved thereby. Moreover, it is considered that cavities (voids) in several ten nanosize are formed in the neighborhood of the surface layer of the magnetic layer by these nanobubbles. By appropriately controlling the amount of these cavities (voids) in the surface layer of the magnetic layer, the cohesive force can be lowered and the run durability can be improved without worsening the electromagnetic conversion characteristics. Furthermore, the existence of these cavities (voids) might contribute to the improvement in shock resistance or the supply of a lubricant to the neighborhood of the surface layer of the magnetic layer.

Compared with the magnetic solution, the additive liquids (the abrasive solution and the carbon black solution) suffer from changes in surface energy due to the ultrasonication treatment. It is assumed that this difference in surface energy causes a phenomenon that these solutions can be hardly mixed together at nanosize in the step of preparing the liquid mixture. It is considered that the coating solution for magnetic layer in this state might induce a phenomenon that the additives (the abrasive and the carbon black) migrate toward the air layer within a short time due to the difference in surface energy in the formation of the coating film. By using this phenomenon, it becomes possible, for example, to efficiently localize diamond particles of 100 nm or less in the surface layer of the magnetic layer. Thus, a required abrasive projection height (for example, 10 to 20 nm) can be ensured even by adding the abrasive in a reduced amount or reducing the particle size of the abrasive by considering head wear. That is to say, a medium having an excellent run durability can be produced thereby while preventing head wear. Similarly, carbon black can be localized in the surface layer of the magnetic layer. Thus, a required carbon black projection height (for example, 15 to 25 nm) can be ensured even by adding the carbon black in a reduced amount or reducing the particle size of the carbon black. Thus, the contact between the abrasive and the carbon black can be regulated and head wear can be further prevented. At the same time, the microprojection density is elevated and the run durability is improved. Since reduction in the amount of the additives (the abrasive and the carbon black) contributes to the improvement in packing ratio of the magnetic material, a medium capable of achieving both of a high run durability and improved electromagnetic conversion characteristics can be produced by controlling the amount of the cavities (voids) in the surface layer of the magnetic layer. In the case where the projection heights of the additives (the abrasive and the carbon black) are elevated by the production method according to the invention, it is preferable to appropriately controlled them by conducting the calendering treatment at a high temperature, a high pressure and a low speed.

In the method of producing the magnetic recording medium according to the invention, a coating composition for the magnetic layer is applied on the surface of the nonmagnetic support, which is kept running, in such an amount as to give a desired film thickness to thereby form the magnetic layer. In this step, multiple coating compositions for magnetic layer may be simultaneously or successively applied. Also, a coating composition for nonmagnetic layer and a coating solution for magnetic layer may be simultaneously or successively applied. Coating apparatuses usable for applying the coating composition for magnetic layer or the coating composition for nonmagnetic layer as described above include an air doctor coater, a blade coater, a rod coater, an extrusion coater, an air knife coater, a squeeze coater, an impregnation coater, a reverse-roll coater, a transfer roll coater, a gravure coater, a kiss coater, a cast coater, a spray coater, and spin coater. With respect to these coating apparatuses, reference may be made, for example, to *Saishin Kotingu Gijutsu*, published by Sogo Gijutsu Center K.K. (May 31, 1983).

In the case of a magnetic tape, the coating layer of the magnetic layer coating composition may be subjected to a magnetic orientation treatment to the ferromagnetic powder contained in the coating layer of the magnetic layer coating composition with the use of a cobalt magnet or a solenoid. In the case of a disk, a sufficiently isotropic orienting property may be obtained without performing orientation using an orientation apparatus. However, it is preferable to employ a publicly known random orientation apparatus, where cobalt magnets are diagonally and alternately located or an AC magnetic field is applied by a solenoid. As for the isotropic orientation, in the case of a ferromagnetic metal fine powder, in-plane two dimensional random orientation is generally preferred but three dimensional random orientation may also be provided by incorporating a vertical component. Furthermore, vertical orientation may be provided using a well-known method such as different pole and counter position magnet to have isotropic magnetic characteristics in the circumferential direction. In particular, when high-density recording is performed, vertical orientation is preferred. Also, circumferential orientation may be provided using spin coating.

The drying position of the coating is preferably controlled by controlling the temperature and amount of drying air and the coating speed. The coating speed is preferably from 20 m/min to 1000 m/min and the temperature of drying air is preferably 60° C. or higher. Furthermore, preliminary drying may also be appropriately performed before entering the magnet zone.

The coated master roll thus obtained is once wound using a winding roll and then unwound from the winding roll followed by a calendering treatment.

In the calendering treatment, for example, a supercalender roll can be used. By performing the calendering treatment, the surface smoothness is improved, holes formed due to the removal of the solvent at the drying disappear and the packing ratio of ferromagnetic powder in the magnetic layer is elevated. As a result, the obtained magnetic recording medium can have high electromagnetic conversion characteristics. In this calendering step, it is preferable to perform the calendering treatment while altering the conditions depending on the surface smoothness of the coated master roll.

It is sometimes observed that the coated master roll shows a decrease in glossiness from the core side toward the outside of the wound roll, which causes variation in qualities in the longitudinal direction. It is known that glossiness correlates (being proportional) to surface roughness (Ra). When the calendering treatment conditions (for example, calender roll pressure) are not altered but maintained at a constant level during the calendering treatment step, therefore, no countermeasure is taken against the difference in smoothness in the longitudinal direction that is caused by winding the coated master roll. In its turn, the final product also suffers from the variation in qualities in the longitudinal direction.

In the calendering treatment step, therefore, it is preferable to alter the calendering treatment conditions (for example, calender roll pressure) to thereby compensate for the difference in smoothness in the longitudinal direction that is caused by winding the coated master roll. More specifically speaking, it is preferred that the calender roll pressure is lowered from the core side toward the outside of the coated master roll having been unwound from the winding roll. According to the inventors' studies, it is found out that the glossiness is lowered (i.e., the smoothness is lowered) by lowering the calender roll pressure. Thus, the difference in smoothness in the longitudinal direction that is caused by winding the coated master roll can be compensated and a final product free from variation in qualities in the longitudinal direction can be obtained.

Although the case where the calender roll pressure is altered is described above, it is also possible to control the calender roll temperature, the calender roll speed or the calender roll tension. By taking the characteristics of a coating vehicle into consideration, it is preferable to control the calender roll pressure or the calender roll temperature. By lowering the calender roll pressure or lowering the calender roll temperature, the surface smoothness of the final product is lowered. By elevating the calender roll pressure or elevating the calender roll temperature, on the contrary, the surface smoothness of the final product is elevated.

Separately, heat curing can be promoted by thermally treating the magnetic recording medium obtained after the calendering treatment. An appropriate thermal treatment may be determined depending on the formulation of a coating composition for magnetic layer. For example, it can be performed at 35 to 100° C., preferably 50 to 80° C. The thermal treatment is conducted for 12 to 72 hours, preferably 24 to 48 hours.

As the calender roll, use may be made of a thermostable plastic roll made of epoxy, polyimide, polyamide, polyamideimide, etc. It is also possible to perform the treatment using a metallic roll.

The calendering treatment conditions to be employed for achieving such a high surface smoothness are as follows. Namely, the calender roll temperature is controlled to from 60 to 100° C., preferably from 70 to 100° C. and particularly preferably from 80 to 100° C.; the pressure is controlled to from 100 to 500 kg/cm (98 to 490 kN/m), preferably from 200 to 450 kg/cm (196 to 441 kN/m) and particularly preferably from 300 to 400 kg/cm (294 to 392 kN/m).

The magnetic layer in the magnetic recording medium according to the invention has an average surface roughness (Ra) at the center of the surface measured by using an atomic force microscope (AFM) of 2 nm or less, preferably from 0.5 to 1.5 nm. The maximum height (Rmax) (the maximum morphological displacement in a measurement area of 5 μm×5 μm) thereof is 50 nm or less, preferably from 10 to 50 nm. The average surface roughness (Ra) at the center of the surface and the maximum height (Rmax) in the invention are defined in Examples. The ten point average roughness (Rz) of the magnetic layer is preferably 30 nm or less. These factors can be easily controlled by controlling the surface properties by fillers in the support or varying the surface shape of rollers used in the calendering treatment. Curling is preferably within the range of ±3 mm.

The magnetic recording medium thus obtained can be cut into a desired size with a cutter, etc. before using. Although the cutter is not particularly restricted, it is preferable to employ a cutter provided with multiple pairs of a rotating upper blade (a male blade) and a lower blade (a female blade). The slit speed, the engagement depth, the peripheral velocity ratio of the upper blade (male blade) to the lower blade (female blade), the time of continuously using the slit blades, etc. may be appropriately selected.

[Physical Properties]

The saturation magnetic flux density of the magnetic layer of the magnetic recording medium according to the present invention is preferably from 100 to 400 mT. The antimagnetic force (Hc) of the magnetic layer is preferably from 143.2 to 318.3 kA/m ((1800 to 4000 Oe), more preferably from 159.2 to 278.5 kA/m (2000 to 3500 Oe). Antimagnetic force distribution is preferably narrow, and SFD and SFDr are preferably 0.6 or less, more preferably 0.3 or less.

The magnetic recording medium in the present invention has a friction coefficient against a head at temperature of from −10° C. to 40° C. and humidity of from 0% to 95% of 0.50 or less, preferably 0.3 or less. The surface inherent resistivity of the magnetic surface thereof is preferably from $10^4$ to $10^8$ Ω/sq. The charge potential thereof is preferably from −500 V to +500 V. The elastic modulus at 0.5% elongation of the magnetic layer is preferably from 0.98 to 19.6 GPa (100 to 2000 kg/mm$^2$) in every direction of in-plane. The breaking strength thereof is preferably from 98 to 686 MPa (10 to 70 kg/cm$^2$). The elastic modulus of the magnetic recording medium is preferably from 0.98 to 14.7 GPa (100 to 1500 kg/mm$^2$) in every direction of in-plane. The residual elongation thereof is preferably 0.5% or less. The thermal shrinkage factor thereof at every temperature not exceeding 100° C. is preferably 1% or less, more preferably 0.5% or less, and most preferably 0.1% or less.

The glass transition temperature of the magnetic layer (the maximum of loss tangent in dynamic viscoelasticity measurement at 110 Hz using a dynamic viscoelastometer such as Rheovibron) is preferably from 50° C. to 180° C., and that of the nonmagnetic layer is preferably from 0° C. to 180° C. The loss elastic modulus is preferably within the range of from $1\times10^7$ to $8\times10^8$ Pa ($1\times10^8$ to $8\times10^9$ dyne/cm$^2$), and loss tangent is preferably 0.2 or less. If loss tangent is too great, adhesion failure is liable to occur. These thermal and mechanical characteristics are preferably almost equal in every direction of in-plane of the medium within difference of 10% or less.

The amount of the residual solvent in the magnetic layer is preferably 100 mg/m$^2$ or less, more preferably 10 mg/m$^2$ or less. The cavity ratio of each coating layer is preferably 30% by volume or less, more preferably 20% by volume or less, with both of the nonmagnetic layer and the magnetic layer. The cavity ratio is preferably smaller for obtaining high output but in some cases a specific value should be preferably secured depending upon purposes. For example, in a disk-like medium which is repeatedly used, for example, large cavity ratio contributes to good running durability in many cases.

In the magnetic recording medium according to the present invention, these physical properties of the nonmagnetic layer and the magnetic layer can be varied according to purposes. For example, the elastic modulus of the magnetic layer is made higher to improve running durability and at the same time the elastic modulus of the nonmagnetic layer is made lower than that of the magnetic layer to improve the head touching of the magnetic recording medium.

[Method of Magnetic Record Reproduction]

In the reproduction method of the magnetic recording medium according to the invention, it is preferable to reproduce a signal magnetically recorded at a maximum linear recording density of 200 KFCI or more by using a GMR head. The intershield distance is from 0.08 μm to 0.18 μm and the reproduction track width is from 0.1 μm to 2.5 μm.

In the case where the magnetic recording medium of the invention is a tape-shaped magnetic recording medium, even a signal recorded in a higher frequency region compared with the conventional ones can be reproduced at a high S/N ratio by using a GMR head as a reproduction head. Thus, the magnetic recording medium of the invention is highly suitable for magnetic tapes and magnetic recording disks for high-density recording computer data.

EXAMPLES

Next, the present invention will be described in greater detail by referring to the following Examples. It is to be understood that various changes in the components, proportions, operations, orders, etc. can be made without departing from the spirit of the invention and the invention is not construed as being restricted to the following Examples. Unless otherwise noted, every "part" given in Examples is by mass.

Example 1

| Coating solution for magnetic layer | |
|---|---|
| (Magnetic solution) | |
| Magnetic barium ferrite powder | 100 parts |
| (Hc: 2500 Oe (200 kA/m), average tabular diameter: 20 nm) | |
| Sulfonate group-containing polyurethane resin | 15 parts |
| ($SO_3Na$ group concentration 260 eq/t) | |
| Cyclohexanone | 150 parts |
| Methyl ethyl ketone | 150 parts |
| (Abrasive solution) | |
| Diamond powder | 3 parts |
| (Average particle diameter: 80 nm) | |
| Cyclohexanone | 27 parts |
| (Carbon black solution) | |
| Carbon black | 0.5 part |
| (Average particle diameter: 80 nm) | |
| Cyclohexanone | 2 parts |
| (Other components) | |
| Butyl stearate | 1 part |
| Stearic acid | 1 part |
| Polyisocyanate | 2.5 parts |
| (Colonate manufactured by Nippon Polyurethane Industry Co., Ltd.) | |
| (Solvents for finishing) | |
| Cyclohexanone | 180 parts |
| Methyl ethyl ketone | 180 parts |
| Coating solution for nonmagnetic layer | |
| Nonmagnetic inorganic powder: α-iron oxide | 85 parts |
| Average major axis length: 0.15 μm | |
| Average acicular ratio: 7 | |
| Specific BET surface area: 52 $m^2/g$ | |
| Carbon black | 15 parts |
| Average particle diameter: 20 nm | |
| Vinyl chloride copolymer | 13 parts |
| (containing sulfonate group) | |
| Polyurethane resin | 6 parts |
| (containing sulfonate group) | |
| Phenylphosphonic acid | 3 parts |
| Cyclohexanone | 140 parts |
| Methyl ethyl ketone | 170 parts |
| Butyl stearate | 2 parts |
| Stearic acid | 1 part |
| Polyisocyanate | 5 parts |
| (Colonate manufactured by Nippon Polyurethane Industry Co., Ltd.) | |
| Coating solution for backcoat layer | |
| Nonmagnetic inorganic powder: α-iron oxide | 80 parts |
| Average major axis length: 0.15 μm | |
| Average acicular ratio: 7 | |
| Specific BET surface area: 52 $m^2/g$ | |
| Carbon black | 20 parts |
| Average particle diameter: 20 nm | |
| Carbon black | 3 parts |
| Average particle diameter: 100 nm | |
| Vinyl chloride copolymer | 13 parts |
| Sulfonate group-containing polyurethane resin | 6 parts |
| Phenylphosphonic acid | 3 parts |
| Cyclohexanone | 140 parts |
| Methyl ethyl ketone | 170 parts |
| Stearic acid | 3 part |
| Polyisocyanate | 5 parts |
| (Colonate manufactured by Nippon Polyurethane Industry Co., Ltd.) | |
| Methyl ethyl ketone | 400 parts |

The magnetic solution was kneaded in an open kneader and diluted. Then, it was subjected to 8-pass dispersion in a horizontal bead mill dispersion machine using Zr beads having a particle diameter of 0.5 mm (bead packing ratio: 80%, peripheral velocity of rotor: 10 m/sec, each pass having retention time of 2 min). After the completion of the 8-pass dispersion treatment, a 16-pass dispersion was performed using Zr beads having a particle diameter of 0.1 mm (bead packing ratio: 80%, peripheral velocity of rotor: 7 m/sec, each pass having retention time of 2 min). For each of the dispersion passes, the material was received in a tank provided with a stirrer and dispersion was conducted while bubbling air thereinto by stirring.

The carbon black solution was poured into a batch type ultrasonic dispersion machine provided with stirring blades (20 kHz, 600 W, 36 mm oscillator, 15 L tank×2, stirring blade diameter: 95 mm) to give a solution volume of 10 kg. Then it was liquefied by stirring at 1200 rpm for 30 minutes. The carbon black solution thus liquefied was subjected to 6-pass dispersion in a horizontal bead mill dispersion machine using Zr beads having a particle diameter of 0.5 mm (bead packing ratio: 80%, peripheral velocity of rotor: 10 m/sec, each pass having retention time of 2 min). Next, this solution was stirred in a dissolver stirrer at a peripheral velocity of 10 m/sec for 30 minutes and subjected to 2-pass dispersion in a flow type ultrasonic dispersion machine (US-1200; manufactured by NISSEI Corporation, 200 kHz, 1200 W, irradiation area: 50 mm in diameter) at a flow rate of 3 kg/min.

The abrasive solution was poured into a batch type ultrasonic dispersion machine provided with stirring blades (20 kHz, 600 W, 36 mm oscillator, 15 L tank×2, stirring blade diameter: 95 mm) to give a solution volume of 10 kg. Then it was liquefied by stirring at 1200 rpm for 30 minutes. The abrasive solution thus liquefied was subjected to 9-pass dispersion in a flow type ultrasonic dispersion machine (US-1200; manufactured by NISSEI Corporation, 200 kHz, 1200 W, irradiation area: 50 mm in diameter) at a flow rate of 0.3 kg/min. The abrasive thus ultrasonicated was once received in a tank and then filtered through a dead-end type filter having an absolute accuracy of 1 μm.

The magnetic solution, the carbon black solution and the abrasive solution were introduced together with other components (a lubricant and a curing agent) and the solvents for finishing into a dissolver stirrer and stirred at a stirring blade peripheral velocity of 10 m/sec for 30 minutes. Next, the mixture was subjected to 1-pass dispersion in a triple flow type ultrasonic dispersion machine (US-1200, 20 KHz, 1200 W, irradiation area: 50 mm in diameter) at a flow rate of 7.5 kg/min. Next, it was filtered through a dead-end type filter having an absolute accuracy of 1 μm to thereby give a coating solution for magnetic layer. The coating solution for magnetic layer thus prepared was once allowed to stand at room temperature and poured as a batch into a tank provided with a stirrer immediately before coating. Thus, the coating solution was supplied.

To prepare the coating solution for nonmagnetic layer, the above-described components excluding the lubricant (butyl stearate and stearic acid) and polyisocyanate were kneaded in an open kneader and diluted. Then, it was subjected to 8-pass dispersion in a horizontal bead mill dispersion machine using Zr beads having a particle diameter of 0.5 mm (bead packing ratio: 80%, peripheral velocity of rotor: 10 m/sec, each pass having retention time of 6 min). After adding the lubricant (butyl stearate and stearic acid) and polyisocyanate, the mixture was mixed and stirred in a dissolver stirrer at a peripheral velocity of 10 m/sec for 30 min and then filtered through a dead-end type filter having an absolute accuracy of 1 μm to thereby give the coating solution for nonmagnetic layer.

To prepare the coating solution for backcoat layer, the above-described components excluding the lubricant (stearic acid), polyisocyanate and methyl ethyl ketone (400 parts) were kneaded in an open kneader and diluted. Then, it was subjected to 8-pass dispersion in a horizontal bead mill dispersion machine using Zr beads having a particle diameter of 1 mm (bead packing ratio: 80%, peripheral velocity of rotor: 10 m/sec, each pass having retention time of 6 min). After adding the lubricant (stearic acid), polyisocyanate and methyl ethyl ketone (400 parts), the mixture was mixed and stirred in a dissolver stirrer at a peripheral velocity of 10 m/sec for 30 min and then filtered through a dead-end type filter having an absolute accuracy of 1 μm to thereby give the coating solution for backcoat layer.

To a polyethylene phthalate support having a thickness of 6 μm, the coating solution for nonmagnetic layer was applied and dried to give a dry thickness of 1.5 μm. Next, the coating solution for magnetic layer was applied thereon and dried to give a dry thickness of 0.08 μm. While the magnetic layer was still in the moist state, orientation was conducted in the vertical direction using a magnet of 0.10 T followed by drying. After applying the coating solution for magnetic layer, the coating solution for backcoat layer was applied on the opposite face of the support and dried to give a dry thickness of 0.5 μm. Next, the product was surface-smoothened by using a calender having metal rolls alone at a calendering speed of 100 m/min under a linear pressure of 300 kg/cm (294 kN/m) at a temperature of 90° C. After curing, a thermal treatment was conducted in a dry environment at 70° C. for 24 hours. After the completion of the thermal treatment, the tape was slit in ½ in. width. The surface of the magnetic layer was cleaned with a tape cleaner that was attached to the apparatus for feeding and winding the slit product so that a nonwoven fabric and a razor blade were pressed against the magnetic face. Thus, a tape sample was obtained.

Using a multifunctional scanning probe microscope (SPM) (D3100; manufactured by Digital Instrument), the arithmetic average of phase difference was measured under the following conditions.
　Mode: tapping mode
　Measurement area: 5 μm×5 μm
　Tip: Diamond needle having curvature of 10 nm
　Scan rate: 1 Hz
　Scan angle: 0°
　Tip speed: 10 μm/sec
　Scan number: 512
　Probe frequency: 265 to 269 Hz
　Phase: 70°
　Output: 1.3 to 2.4 V Using the atomic force microscope (AFM) as described above, the average surface roughness (Ra) at the center of the surface and the maximum height (Rmax) of the magnetic layer were measured.
　Mode: AFM mode (contact mode)
　Measurement area: 5 μm×5 μm
　Tip: Diamond needle having curvature of 10 nm
　Scan number: 512

The magnetic tape thus obtained was evaluated in run durability and head wear by the following methods.

Run durability: In an environment of 23° C. and 50%, the magnetic tape of ½ in. in width was wrapped at 180° under a 100 g load in such a manner that the magnetic layer was in contact with an Altic member and then subjected to 100-pass continuous sliding at a speed of 14 mm/sec. After the completion of the sliding, damages on the magnetic layer were evaluated as follows. By observing the slid face at 4 positions under an optical microscope at 50× magnification, a sample showing no damage (for example, stripping of the magnetic layer, sliding scuff, etc.) was evaluated as A; one showing at least one damage per filed (50× magnification) was evaluated as C; and one showing the intermediate conditions was evaluated as B.

Head wear: Using a marketed SDLT drive (SDLT320; manufactured by Quantum), a tape sample (length: 600 m) repeatedly run in an environment at 23° C. and 50% for 600 hours.

The difference in height between the guard part and the MR head part was measured under an atomic force microscope before and after the running to determine the head wear. Head wear is expressed in a relative value determined by regarding the value of Comparative Example 4 as to 1.

Example 2

The procedure of Example 1 was followed but using diamond particles having an average particle diameter of 50 nm.

Comparative Example 1

The procedure of Example 1 was followed but using diamond particles having an average particle diameter of 150 nm.

Comparative Example 2

A coating solution for magnetic layer having the same formulation as in Example 1 was used. The magnetic solution and the carbon black solution were kneaded to prepare a crude dispersion. Next, diamond particles were added as a powder. The resultant mixture was dispersed in a vertical batch bead mill dispersion machine by using Zr beads having a particle diameter of 0.5 mm for a retention time of 720 min. Then, the lubricant and the curing agent were added as other components and the mixture was fed into a dissolver stirrer and stirred at a stirring blade peripheral velocity of 10 m/sec for 30 minutes. Subsequently, it was filtered through a dead-end type filter having an absolute accuracy of 1 μm to thereby give the coating solution for magnetic layer. Immediately before the application, the coating solution for magnetic layer pre pared above was continuously stirred in a liquid-feeding tank at a stirring blade peripheral velocity of 10 m/sec or higher. The subsequent treatments were the same as in Example 1.

Comparative Example 3

The procedure of Comparative Example 2 was followed but using no diamond particle.

Comparative Example 3

The procedure of Example 1 was followed but using a ferromagnetic metal powder (composition: Co/Fe=25 at %, Al/Fe=7 at %, Y/Fe=12 at %, average major axis length: 0.45 μm, Hc: 191 kA/:m, σs: 117 A m²/kg, $S_{BET}$: 62 m²/g, crystalline size: 110 Å, average acicular ratio: 5) as the ferromagnetic powder in the coating solution for magnetic layer.

Table 1 summarizes the results.

TABLE 1

|  | Average diamond particle diameter (nm) | Amount of diamond added (parts) | Ra (nm) | Rmax (nm) | Arithmetic average of phase difference (°) | Run durability | Head wear |
|---|---|---|---|---|---|---|---|
| Example 1 | 80 | 3 | 1.2 | 28 | 5.0 | A | 2 |
| Example 2 | 50 | 3 | 1.1 | 25 | 5.2 | A | 1 |
| Comparative Example 1 | 150 | 3 | 1.4 | 63 | 9.5 | A | 10 |
| Comparative Example 2 | 80 | 3 | 1.5 | 39 | 1.8 | C | Unmeasurable |
| Comparative Example 3 | No | No | 1.4 | 20 | 1.0 | C | Unmeasurable |
| Comparative Example 4 | 80 | 3 | 2.5 | 60 | 4.5 | B | 1 |

Table 1 indicates that the magnetic recording media of the invention, each having an arithmetic average of phase difference detected under an atomic force microscope in the tapping mode of 2 to 20°, were excellent in run durability and caused little head wear while sustaining ultrasmooth surface.

According to the invention, it is possible to provide a magnetic recording medium of the coated type which has smooth surface properties, has small spacing between head and the medium, enables high-density recording, shows favorable running performance and causes little head wear, and a method of producing a magnetic recording medium whereby the above-described characteristics can be established while achieving a high productivity.

The entire disclosure of each and every foreign patent application from which the benefit of foreign priority has been claimed in the present application is incorporated herein by reference, as if fully set forth.

What is claimed is:
1. A magnetic recording medium, which comprises:
   a nonmagnetic support; and
   a magnetic layer comprising a ferromagnetic powder and a binder,
   wherein an average surface roughness (Ra) at a center of a surface of the magnetic layer measured by using an atomic force microscope (AFM) is 2 nm or less, the maximum height (Rmax) thereof is 50 nm or less, and
   an arithmetic average of phase difference between a drive signal and a response signal of a probe measured with the atomic force microscope in a tapping mode is from 2 to 20°,
   wherein the surface layer of the magnetic layer has microcavities.
2. The magnetic recording medium according to claim 1, wherein the ferromagnetic powder is a hexagonal ferrite powder having an average tabular diameter of 30 nm or less.
3. The magnetic recording medium according to claim 1, wherein the magnetic layer further comprises diamond particles having an average particle diameter of 100 nm or less.
4. The magnetic recording medium according to claim 3, wherein an amount of the diamond particles is from 0.05 to 5% by mass based on the ferromagnetic powder.
5. The magnetic recording medium according to claim 1, wherein the arithmetic average of phase difference is from 2 to 10°.
6. The magnetic recording medium according to claim 1, wherein the average surface roughness (Ra) is from 0.5 to 1.5 nm.
7. The magnetic recording medium according to claim 1, wherein the maximum height (Rmax) is from 10 to 50 nm.
8. The magnetic recording medium according to claim 1, which is produced by
   separately dispersing a magnetic solution comprising a ferromagnetic powder and a binder, and an abrasive solution comprising an abrasive; then
   mixing the magnetic solution with the abrasive solution to give a coating solution for a magnetic layer; and
   applying the coating solution on a nonmagnetic support to form a magnetic layer,
   wherein a liquid mixture obtained by mixing the magnetic solution with the abrasive solution is subjected to both of an air-bubbling treatment and an ultrasonication treatment.
9. The magnetic recording medium according to claim 8, wherein the air-bubbling treatment is a treatment that is conducted by stirring with a high-speed stirrer having stirring blades at a stirring blade peripheral speed of 10 m/sec or higher for 5 minutes or longer, and then the ultrasonication treatment is conducted.
10. The magnetic recording medium according to claim 8, which further comprises:
    dispersing a carbon black solution comprising a carbon black with a bead mill; then
    subjecting the obtained dispersion to an air-bubbling treatment followed by an ultrasonication treatment; and then
    mixing the dispersion with the magnetic solution and the abrasive solution to thereby give a coating solution for a magnetic layer.

* * * * *